US012726096B2

(12) United States Patent
Kudo et al.

(10) Patent No.: US 12,726,096 B2
(45) **Date of Patent: *Sep. 1, 2026**

(54) ELECTROMAGNETIC ACTUATOR WITH BOBBIN WITH POSITIONING PART FOR POSITIONING STATOR

(71) Applicant: MIKUNI CORPORATION, Tokyo (JP)

(72) Inventors: Takeshi Kudo, Iwate (JP); Hiroki Sasaki, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 18/633,556

(22) Filed: Apr. 12, 2024

(65) Prior Publication Data

US 2024/0380298 A1 Nov. 14, 2024

(30) Foreign Application Priority Data

May 10, 2023 (JP) ................................ 2023-077669

(51) Int. Cl.
*H02K 33/02* (2006.01)
*H02K 1/18* (2006.01)

(52) U.S. Cl.
CPC ............... *H02K 33/02* (2013.01); *H02K 1/18* (2013.01); *H02K 2203/12* (2013.01)

(58) Field of Classification Search
CPC ....... H01F 7/16; H01F 2007/16; H02K 33/02; H02K 2203/12
See application file for complete search history.

(56) References Cited

U.S. PATENT DOCUMENTS

2004/0252003 A1* 12/2004 Linkner, Jr. .......... H01F 7/1607 336/208
2013/0025959 A1* 1/2013 Nonaka ................ F16K 27/048 180/441
2015/0198126 A1* 7/2015 Marechal ............. F04B 7/0076 251/336
2017/0350528 A1* 12/2017 Fukunaga .......... F16K 31/0675
2021/0206360 A1* 7/2021 Yamasaki ............ H01F 7/1607

FOREIGN PATENT DOCUMENTS

EP 3261103 A1 * 12/2017 ......... F16K 31/0696
JP 2000205432 A * 7/2000
JP 7031171 3/2022
WO WO-2016132467 A1 * 8/2016 ............ H01F 7/121

OTHER PUBLICATIONS

Matsui (JP 2000205432 A) English Translation (Year: 2019).*

* cited by examiner

*Primary Examiner* — Tulsidas C Patel
*Assistant Examiner* — Robert E Mates
(74) *Attorney, Agent, or Firm* — JCIPRNET

(57) ABSTRACT

An electromagnetic actuator includes: a mover, reciprocating along a predetermined axis line; a first stator and a second stator, accommodating the mover to be capable of reciprocating in a direction of the axis line and arranged spaced apart in the direction of the axis line; and a bobbin, arranged around the first stator and the second stator and around which a coil for excitation is wound. The bobbin includes: a through hole, through which the first stator and the second stator pass; and a positioning part, partially formed in the through hole, allowing the first stator and the second stator to be fitted thereinto, and positioning the first stator and the second stator on the axis line.

14 Claims, 20 Drawing Sheets

ELECTROMAGNETIC ACTUATOR WITH BOBBIN WITH POSITIONING PART FOR POSITIONING STATOR

CROSS-REFERENCE TO RELATED APPLICATIONS

This application claims the priority benefit of Japan Application No. 2023-077669, filed on May 10, 2023. The entirety of the above-mentioned patent application is hereby incorporated by reference herein and made a part of this specification.

BACKGROUND

Technical Field

The disclosure relates to an electromagnetic actuator using electromagnetic force of a solenoid as a driving force, and in particular, to an electromagnetic actuator equipped with a cylindrical stator (inner yoke) that accommodates a mover to be capable of reciprocating.

Related Art

As a conventional electromagnetic actuator, there has been known an electromagnetic solenoid including: a mover, reciprocating in a predetermined axis line direction; a shaft pin, fixed to the mover; a first core part (first stator) and a second core part (second stator), consisting of two members that accommodate the mover to be capable of reciprocating and form a magnetic path; a case, forming a magnetic path; a bobbin, arranged around the first core part and the second core part; and a coil for excitation, wound around the bobbin (see, for example, Japanese Patent No. 7031171).

In the above electromagnetic actuator, the first core part and the second core part are formed in a cylindrical shape and accommodate the mover to be capable of reciprocating, and a collar of a cylindrical shape is adopted to position (align axial centers of) the first core part and the second core part so that the mover can move smoothly. By forming a press-fit outer peripheral surface having a reduced outer diameter at an outer periphery of the first core part, forming a press-fit outer peripheral surface having the same outer diameter as the press-fit outer peripheral surface of the first core part at an outer periphery of the second core part, fitting the press-fit outer peripheral surface of the first core part into the collar from one side and fitting the press-fit outer peripheral surface of the second core part into the collar from the other side, the first core part and the second core part are positioned.

However, since the above electromagnetic actuator has a configuration in which positioning (alignment of axial centers) of the first core part and the second core part is performed adopting the collar which is a dedicated part for positioning, the number of parts is increased, the structure becomes complex, and the cost is increased.

SUMMARY

An electromagnetic actuator of the disclosure includes: a mover, reciprocating along a predetermined axis line; a first stator and a second stator, accommodating the mover to be capable of reciprocating in a direction of the axis line and arranged spaced apart in the direction of the axis line; and a bobbin, arranged around the first stator and the second stator and around which a coil for excitation is wound. The bobbin includes: a through hole, through which the first stator and the second stator pass; and a positioning part, partially formed in the through hole, allowing the first stator and the second stator to be fitted thereinto, and positioning the first stator and the second stator on the axis line.

DESCRIPTION OF THE EMBODIMENTS

Figure 1:
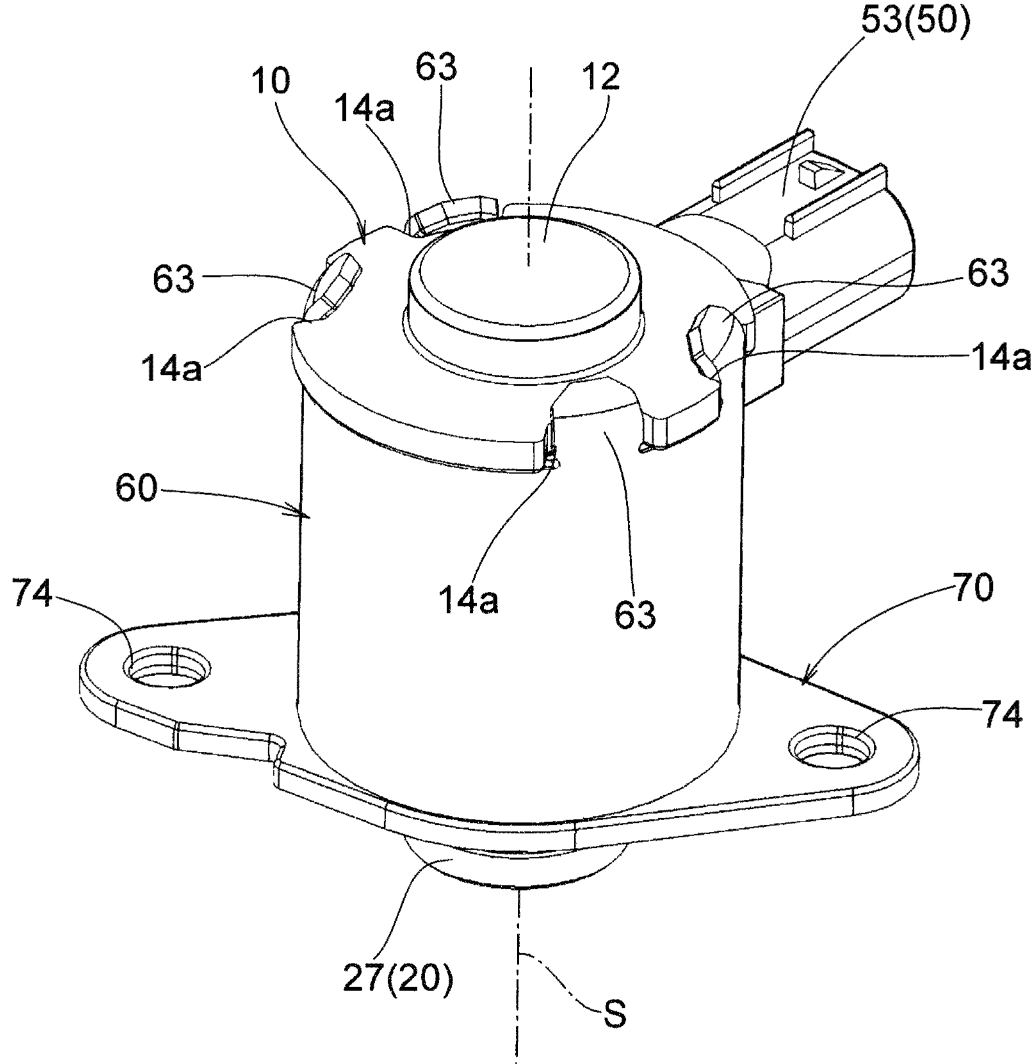
FIG. 1 shows an electromagnetic actuator according to a first embodiment of the disclosure, and is an external perspective view as seen obliquely from one direction.
Figure 2:
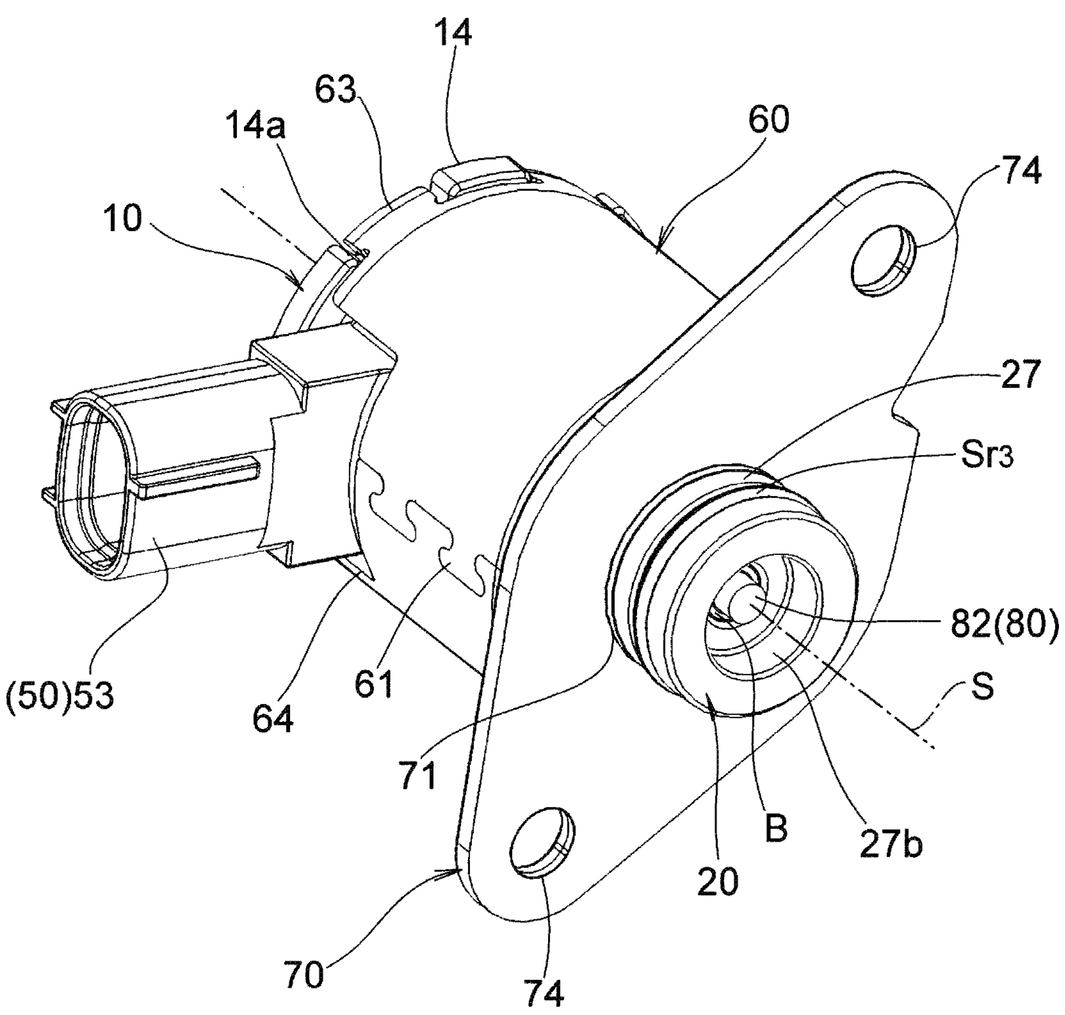
FIG. 2 shows the electromagnetic actuator according to the first embodiment, and is an external perspective view as seen from another direction (side where the electromagnetic actuator is attached to an application object).

The disclosure provides an electromagnetic actuator in which the structure can be simplified, the cost can be reduced, the number of parts can be reduced, and smooth operation of a mover can be ensured.

In the above electromagnetic actuator, a configuration may be adopted in which the positioning part includes a plurality of ridges protruding from an inner wall surface of the through hole and extending in the direction of the axis line.

In the above electromagnetic actuator, a configuration may be adopted in which the positioning part includes: a first positioning part, formed near one end opening of the through hole in the direction of the axis line and positioning the first stator; and a second positioning part, formed near the other end opening of the through hole in the direction of the axis line and positioning the second stator.

In the above electromagnetic actuator, a configuration may be adopted in which each of the first positioning part and the second positioning part includes a plurality of ridges protruding from the inner wall surface of the through hole and extending in the direction of the axis line.

In the above electromagnetic actuator, a configuration may be adopted in which the through hole includes: a first through hole, centered on the axis line; and a second through hole, adjacent to the first through hole in the direction of the axis line and having a smaller diameter than the first through hole. The first positioning part is formed in an area of the first through hole; and the second positioning part is formed in an area of the second through hole.

In the above electromagnetic actuator, a configuration may be adopted in which the first positioning part includes a plurality of ridges protruding from an inner wall surface of the first through hole and extending in the direction of the axis line; and the second positioning part includes a plurality of ridges protruding from an inner wall surface of the second through hole and extending in the direction of the axis line.

In the above electromagnetic actuator, a configuration may be adopted in which the first positioning part includes a plurality of ridges protruding from the inner wall surface of the first through hole and extending in the direction of the axis line; the second positioning part includes a plurality of ridges protruding from the inner wall surface of the second through hole and extending in the direction of the axis line; and the first positioning part is formed so that a protruding end thereof is flush with the inner wall surface of the second through hole.

In the above electromagnetic actuator, a configuration may be adopted in which the first stator includes: a cylindrical part, defining an inner peripheral surface that receives the mover; a bottom wall, blocking one end side of the cylindrical part and defining a rest position of the mover; and an outer peripheral fitting part, fitted into the positioning part. The second stator includes: an insertion hole, receiving the mover and exposing the mover at a tip thereof; and an outer peripheral fitting part, fitted into the positioning part.

In the above electromagnetic actuator, a configuration may be adopted in which the mover includes: a plunger, made of a magnetic material; and a shaft, made of a nonmagnetic material, fixed to the plunger, and exerting a driving force to the outside. The second stator includes a guide hole that slidably guides the shaft. The inner peripheral surface of the first stator receives the plunger in a non-contact manner to be capable of reciprocating. The insertion hole of the second stator receives the shaft in a non-contact manner to be capable of reciprocating.

In the above electromagnetic actuator, a configuration may be adopted in which the second stator includes a stopper that defines an operating position of the mover.

In the above electromagnetic actuator, a configuration may be adopted in which the bobbin is provided with an outer cover member formed to cover the coil and including a connector that surrounds a terminal connected to an end of the coil.

In the above electromagnetic actuator, a configuration may be adopted including: an annular seal member, interposed between the second stator and the bobbin; and an annular seal member, interposed between the first stator and the outer cover member or the bobbin.

In the above electromagnetic actuator, a configuration may be adopted including an outer magnetic path member that is connected to the first stator and the second stator and forms a magnetic path.

In the above electromagnetic actuator, a configuration may be adopted in which the outer magnetic path member includes: a cylindrical member, connected to the first stator and surrounding the bobbin; and a flat plate member, connected to the second stator and the cylindrical member.

In the above electromagnetic actuator, a configuration may be adopted in which the flat plate member also serves as a flange member for attachment to an attachment object.

In the above electromagnetic actuator, a configuration may be adopted in which the mover is provided with a buffer unit that absorbs impact upon the mover contacting the first stator and returning to the rest position.

According to the electromagnetic actuator having the above configuration, the structure can be simplified, the cost can be reduced, the number of parts can be reduced, assembly work can be facilitated, and smooth operation of the mover can be ensured.

Hereinafter, embodiments of the disclosure are described with reference to the accompanying drawings.

An electromagnetic actuator according to the disclosure is applied to an application object that exerts a driving force to the outside, for example, a cam switching mechanism of an internal combustion engine, or an oil passage switching valve or other on/off switching mechanisms.

As shown in FIG. 1 to FIG. 13, an electromagnetic actuator according to a first embodiment includes: a first stator 10; a second stator 20; a bobbin module Bm; a cylindrical member 60 and a flat plate member 70 as an outer magnetic path member; a mover 80; a buffer unit 90; and annular seal members $Sr_1$, $Sr_2$, and $Sr_3$.

Here, the bobbin module Bm includes a bobbin 30, a coil 40 for excitation, terminals 41 and 42, and an outer cover member 50 in which the bobbin 30 and the coil 40 are embedded.

The first stator 10 is formed by machining or forging using soft iron or the like, and functions as a magnetic path through which a line of magnetic force passes. As shown in FIG. 3 to FIG. 5, FIG. 10, and FIG. 11, the first stator 10 includes a cylindrical part 11, a bottom wall 12, an outer peripheral fitting part 13, and a flange 14.

The cylindrical part 11 includes an inner peripheral surface 11*a* and an outer peripheral surface 11*b* centered on an axis line S. In order to accommodate a plunger 81 of the mover 80 in a non-contact manner so that the plunger 81 is freely movable in the axis line S direction, the inner peripheral surface 11*a* faces an outer peripheral surface 81*a* of the mover 80 (plunger 81) with a predetermined gap in a radial direction perpendicular to the axis line S.

The outer peripheral surface 11*b* is formed as a cylindrical surface centered on the axis line S on both sides of the flange 14 in the axis line S direction. In an assembled state, the outer peripheral surface 11*b* is maintained not in contact with an annular tapered surface 32*b* of the bobbin 30.

The bottom wall 12 is continuous with the cylindrical part 11 and is formed in a disk shape perpendicular to the axis line S, covers the mover 80 in cooperation with the cylindrical part 11, and includes an inner wall surface 12*a* that functions as a stopper defining a rest position of the mover 80.

In order to be fitted into a first positioning part 34 of the bobbin 30, the outer peripheral fitting part 13 is formed as a cylindrical outer peripheral surface having the same outer diameter as the outer peripheral surface 11*b* and centered on the axis line S near a tip side of the cylindrical part 11.

The flange 14 is formed in an annular plate shape extending from the outer periphery of the cylindrical part 11 in the radial direction perpendicular to the axis line S, and includes, in an outer edge area, four notches 14*a*, and a joint surface 14*b* to which the cylindrical member 60 is joined. The flange 14 covers the bobbin module Bm in cooperation with the cylindrical member 60, is joined to the cylindrical member 60 and is fixed by crimping.

The second stator 20 is formed by machining or forging using soft iron or the like, functions as a magnetic path through which a line of magnetic force passes, and also functions as a fixed iron core that attracts the plunger 81 of the mover 80 when the coil 40 is energized. As shown in FIG. 3 to FIG. 5, FIG. 10, and FIG. 11, the second stator 20 includes a recess 21, an insertion hole 22, an outer peripheral surface 23, an outer peripheral fitting part 24, a collar 25, a fitting part 26 and a fitting part 27.

The recess 21 is an area receiving the plunger 81 of the mover 80 that moves to an operating position, and defines an inner peripheral surface 21*a* of a cylindrical shape centered on the axis line S and a stopper 21*b* forming a flat surface perpendicular to the axis line S.

In order to receive, in a non-contact manner, the plunger 81 of the mover 80 that moves to the operating position, the inner peripheral surface 21*a* is formed to have a larger inner diameter than a tip side outer diameter part 81*b* of the plunger 81.

The stopper 21*b* is formed as a separate member subjected to hardening processing such as carburizing, and is then fitted and fixed. An end face 81*c* of the plunger 81 is brought into contact with the stopper 21*b* and the operating position is defined. In order to slidably guide a shaft 82 of the mover 80 in the axis line S direction, a guide hole 21*c* forming a cylindrical hole centered on the axis line S is formed in the stopper 21*b*.

In this way, by adopting the stopper 21*b* that has been subjected to hardening processing, abrasion resistance and mechanical strength against collision of the plunger 81 can be increased compared to a case where the stopper 21*b* is made of a material such as soft iron, and the cost can be reduced compared to a case where the entire second stator 20 is subjected to hardening processing.

The insertion hole 22 is formed as a cylindrical hole centered on the axis line S, allows the shaft 82 of the mover 80 to be inserted therethrough and to reciprocate in a non-contact manner in the axis line S direction, and exposes at a tip thereof the shaft 82 of the mover 80 that exerts a driving force to the outside.

A bearing B is fitted into the insertion hole 22 near the tip side of the insertion hole 22. The bearing B is a bush formed in a cylindrical shape using a hard metal material, and defines a guide hole $B_1$ that slidably guides the shaft 82 of the mover 80 in the axis line S direction.

The outer peripheral surface 23 is a cylindrical surface centered on the axis line S, is formed to be insertable into a second through hole 33 without contacting an inner wall surface 33*a* and a second positioning part 35 of the bobbin 30, and is formed to face the inner wall surface 33*a* in an area deviated from the second positioning part 35.

An annular groove 23*a* and an outer peripheral annular tapered surface 23*b* are formed on the outer peripheral surface 23.

The annular seal member $Sr_2$ is fitted into the annular groove 23*a*.

The annular seal member $Sr_2$ is an O-ring made of a rubber material, is fitted into the annular groove 23*a*, and is interposed between the inner wall surface 33*a* of the bobbin 30 and the second stator 20 in the radial direction perpendicular to the axis line S.

The outer peripheral annular tapered surface 23*b* is formed in a conical shape that tapers toward the cylindrical part 11 of the first stator 10 about the axis line S. The outer peripheral annular tapered surface 23*b* serves to guide a line of magnetic force generated when the coil 40 is energized in a streamlined manner in the axis line S direction of the second stator 20 after the line of magnetic force passes through from the cylindrical part 11 of the first stator 10 to the plunger 81 of the mover 80.

Outside the outer peripheral surface 23 in the axis line S direction, in order to be fitted into the second positioning part 35 of the bobbin 30, the outer peripheral fitting part 24 is formed as a cylindrical outer peripheral surface having a slightly larger outer diameter than the outer peripheral surface 23 and centered on the axis line S. The outer diameter of the outer peripheral surface of the outer peripheral fitting part 24 may be the same as the outer diameter of the outer peripheral surface 23.

The collar 25 is formed as an annular part having a larger outer diameter than the outer peripheral fitting part 24, and defines an annular end face 25*a* and an annular end face 25*b*. An annular joint surface 72 of the flat plate member 70 is joined to the annular end face 25*a*. The annular end face 25*b* faces an annular tapered surface 33*b* of the bobbin 30 in the axis line S direction.

The fitting part 26 is formed as a cylindrical outer peripheral surface centered on the axis line S in order for a central hole 71 of the flat plate member 70 to be closely fitted thereinto.

The fitting part 27 is formed to be fitted into a fitting recess of the application object, includes an annular groove 27*a* on an outer peripheral surface thereof, and includes a recess 27*b* having a larger inner diameter than the insertion hole 22 on an inside thereof. The annular seal member $Sr_3$ is fitted into the annular groove 27*a*.

The annular seal member $Sr_3$ is an O-ring made of a rubber material, is fitted into the annular groove 27*a*, and is interposed between the application object and the second stator 20 in a direction perpendicular to the axis line S.

Figure 6:
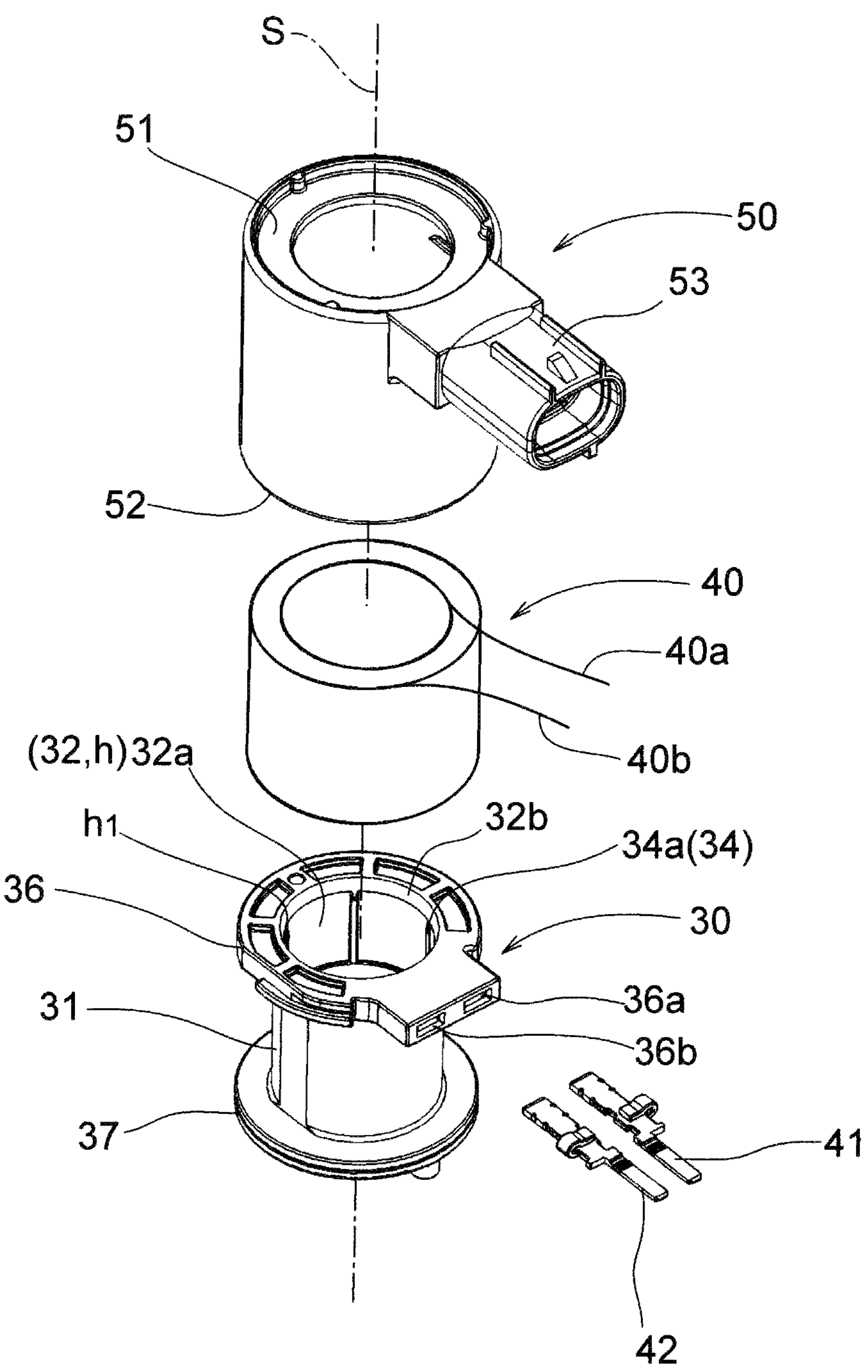
FIG. 6 is an exploded perspective view of a bobbin module (bobbin, coil for excitation, outer cover member, and terminal) included in the electromagnetic actuator according to the first embodiment.

As shown in FIG. 6, the bobbin module Bm includes the bobbin 30, the coil 40 for excitation, the terminals 41 and 42, and the outer cover member 50.

Figure 7:
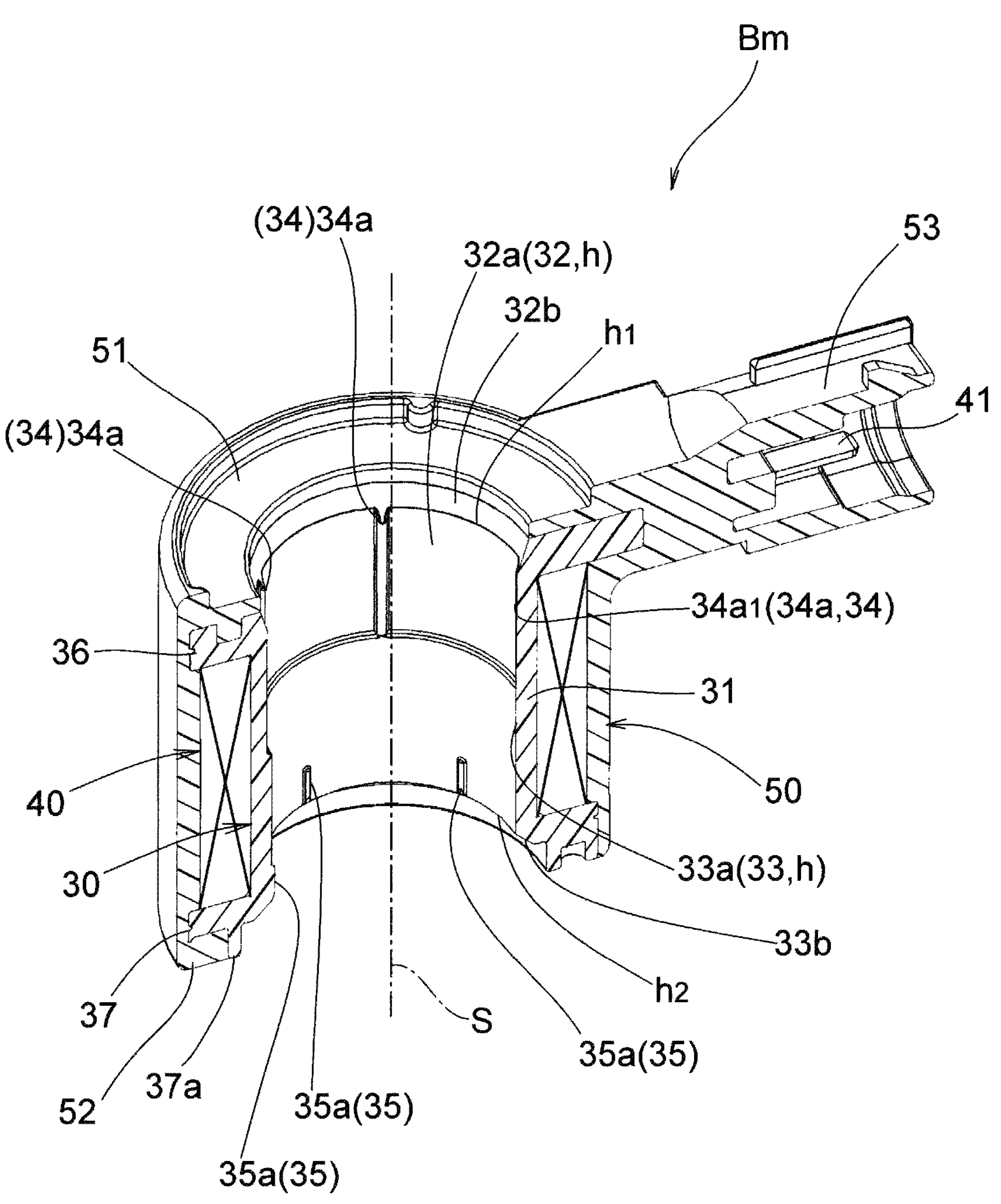
FIG. 7 is a perspective cross-sectional view of the bobbin module included in the electromagnetic actuator according to the first embodiment.
Figure 8:
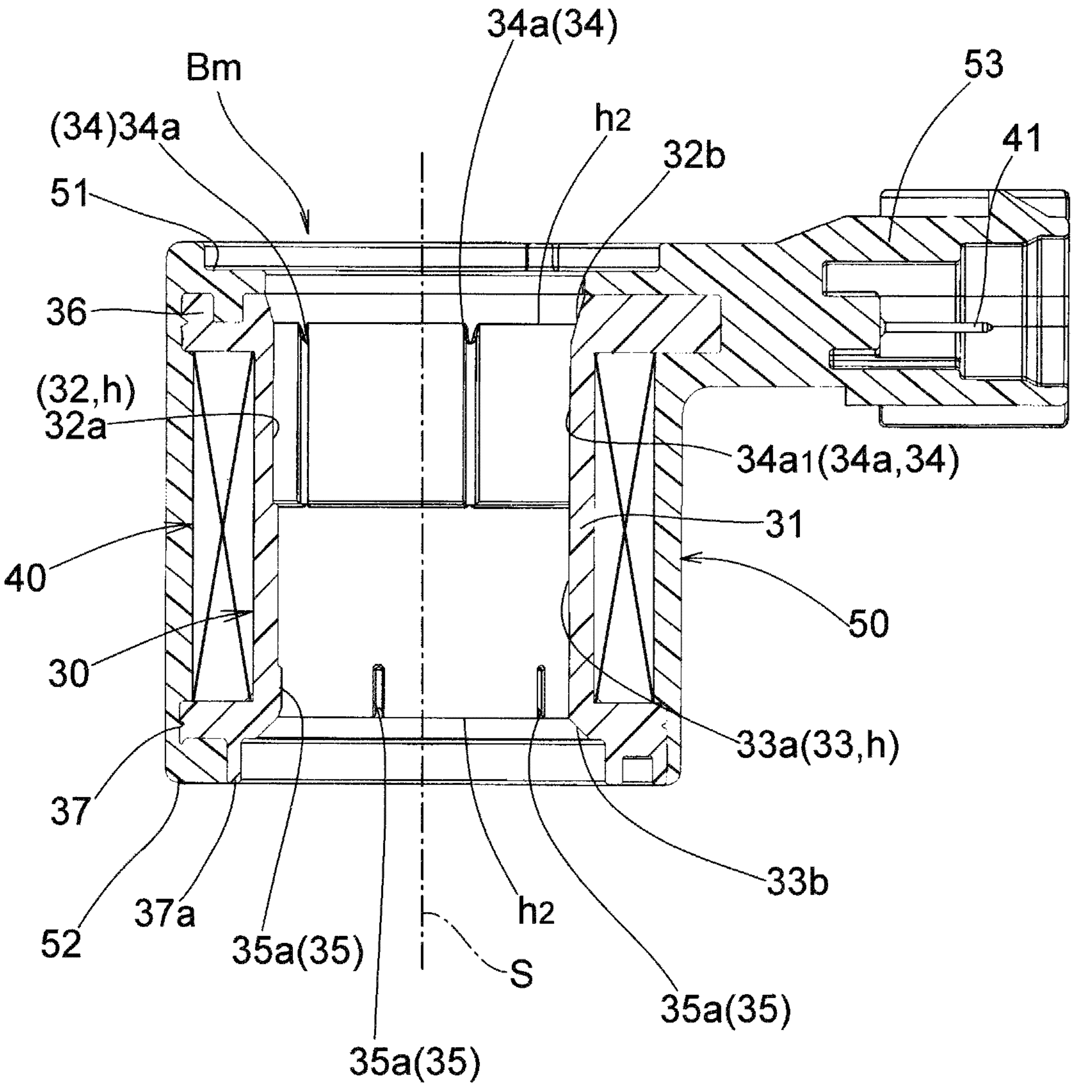
FIG. 8 is a cross-sectional view of the bobbin module included in the electromagnetic actuator according to the first embodiment, taken along a plane including the axis line.
Figure 9:
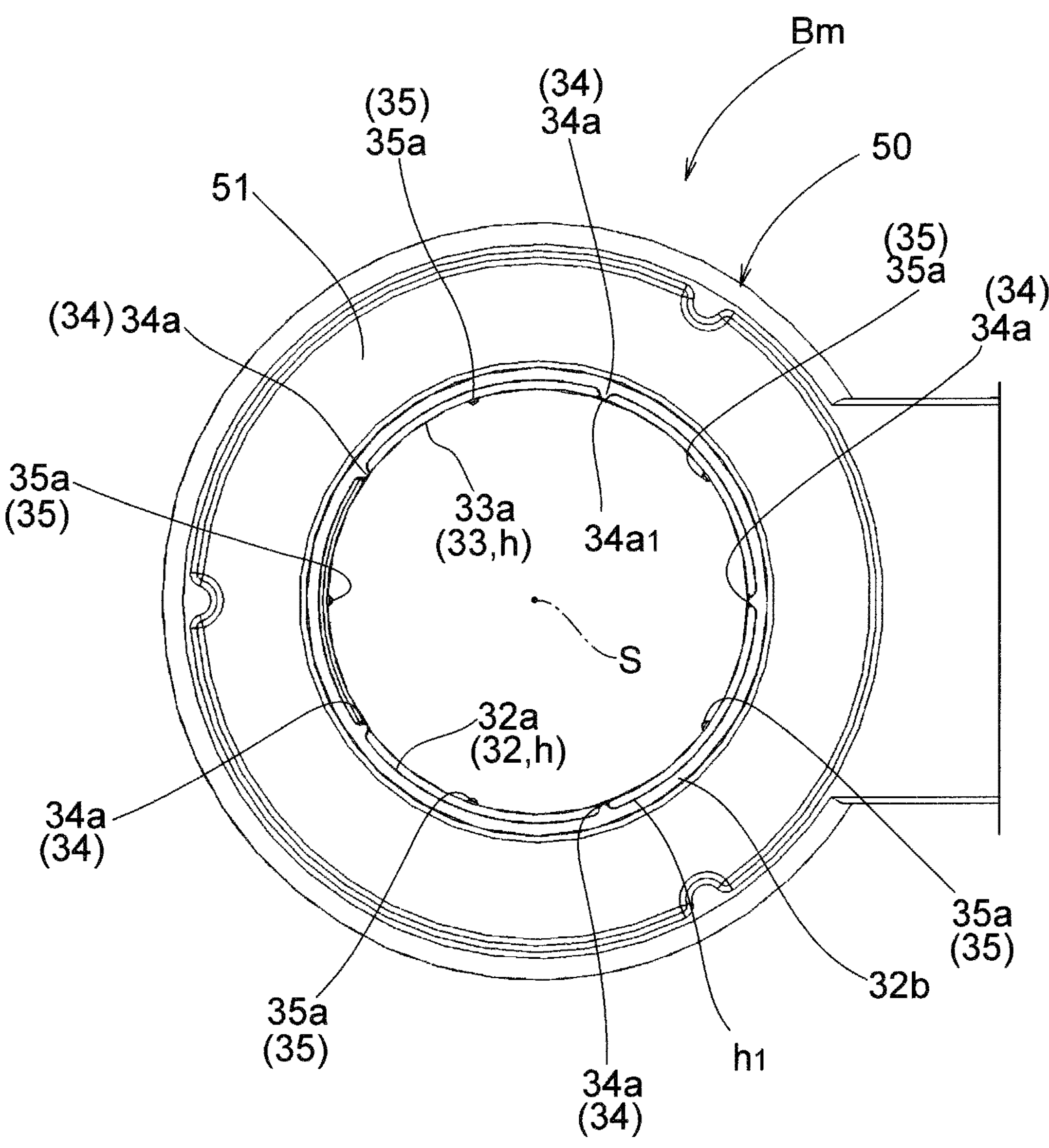
FIG. 9 is an end view of the bobbin module included in the electromagnetic actuator according to the first embodiment as seen from one side in the axis line direction.
Figure 10:
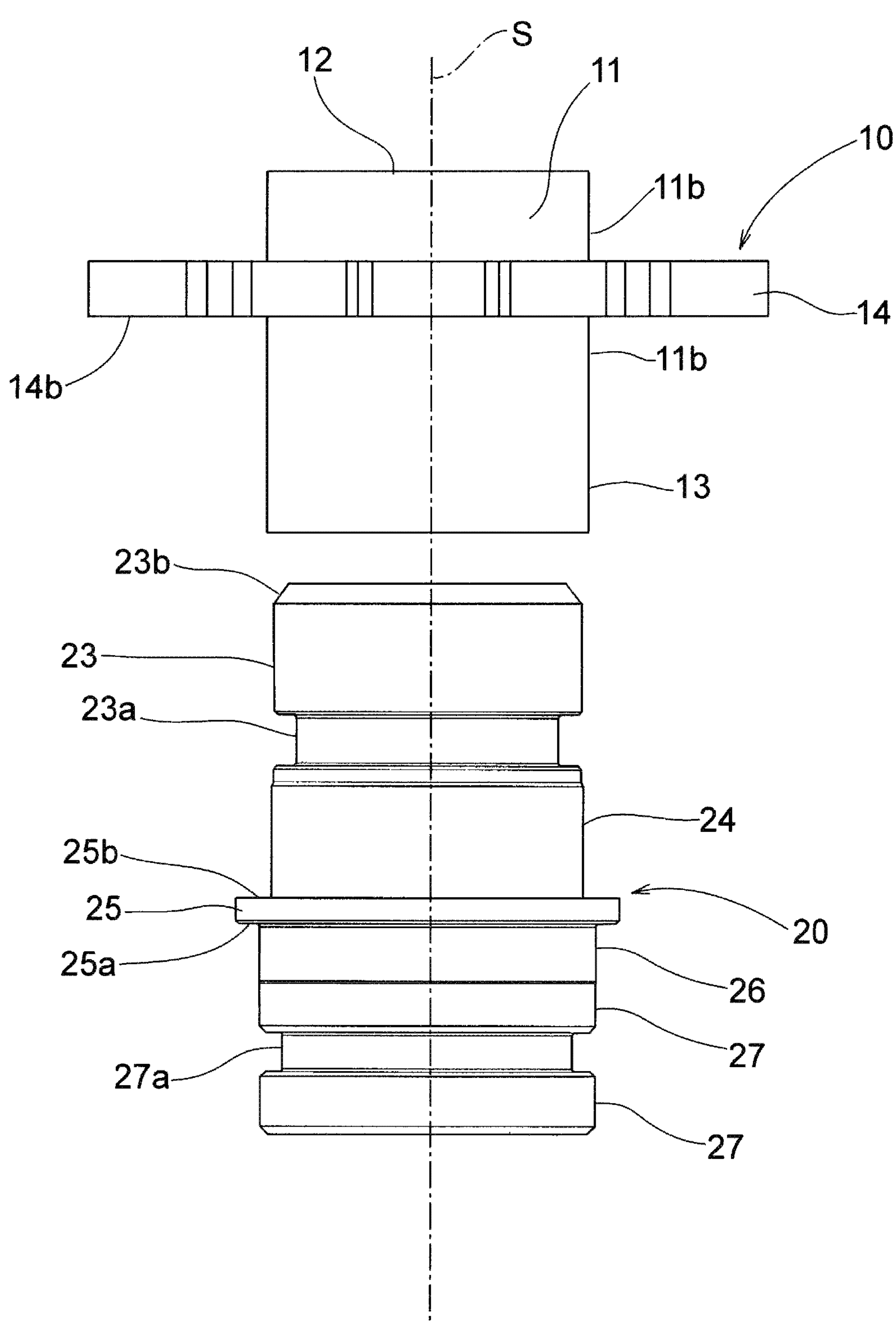
FIG. 10 is a side view showing a first stator and a second stator included in the electromagnetic actuator according to the first embodiment.
Figure 11:
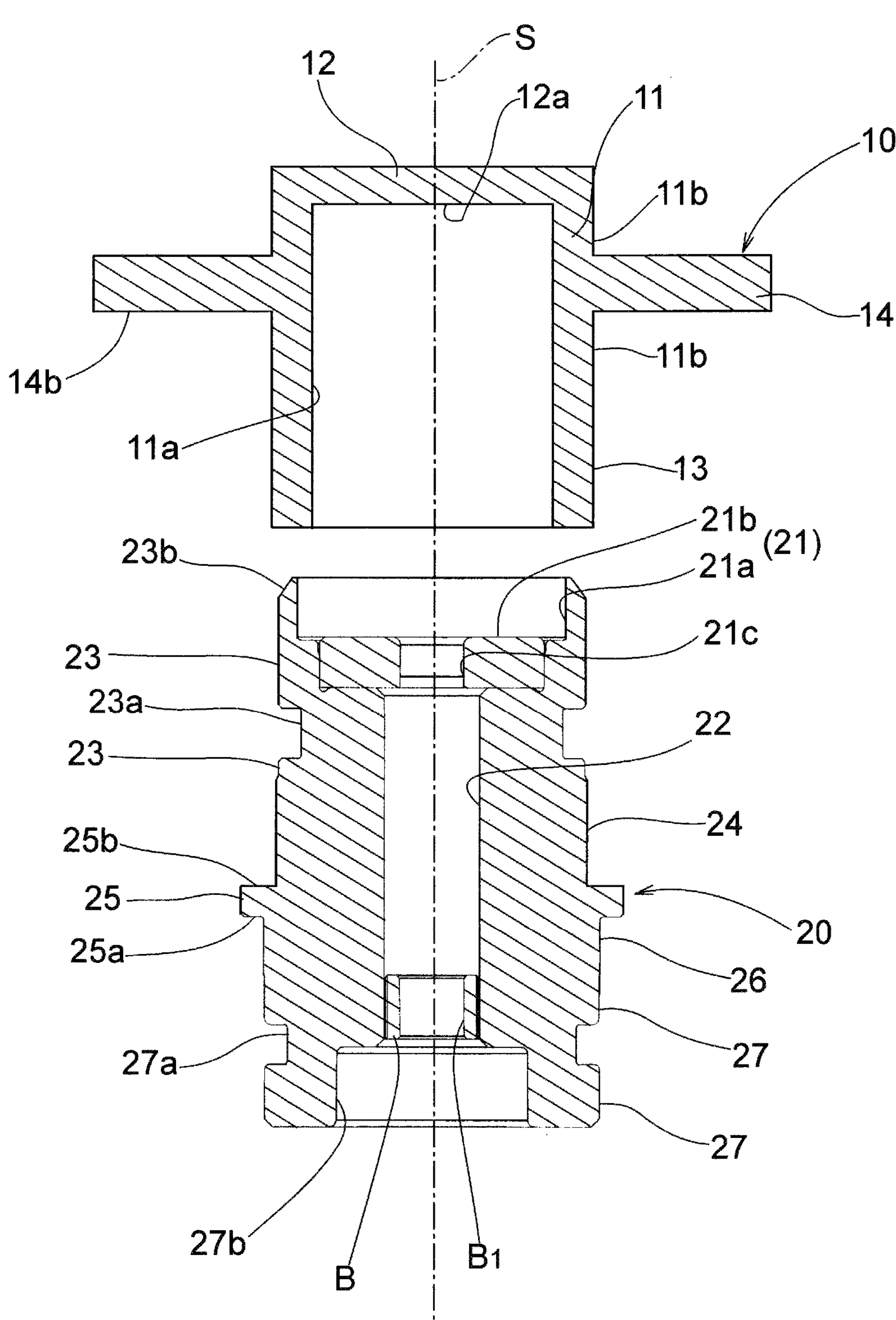
FIG. 11 is a cross-sectional view of the first stator and the second stator shown in FIG. 10, taken along a plane including the axis line.

The bobbin 30 is made of a resin material. As shown in FIG. 7 to FIG. 9, the bobbin 30 includes: a cylindrical part 31 centered on the axis line S; a first through hole 32 and the second through hole 33 as a through hole h; the first positioning part 34; the second positioning part 35; a flange 36; and a flange 37.

The cylindrical part 31 holds the coil 40 wound on an outside thereof.

The first through hole 32 defines an inner wall surface 32*a* of a cylindrical shape centered on the axis line S, and the annular tapered surface 32*b*. The first through hole 32 is formed to allow the cylindrical part 11 and the outer peripheral fitting part 13 of the first stator 10 to pass therethrough in a non-contact manner.

The second through hole 33 is adjacent to the first through hole 32 in the axis line S direction and defines the inner wall surface 33*a* and the annular tapered surface 33*b*, the inner wall surface 33*a* having a cylindrical shape centered on the axis line S and having an inner diameter smaller than that of the inner wall surface 32*a* of the first through hole 32. The second through hole 33 is formed to allow the outer peripheral surface 23 and the outer peripheral fitting part 24 of the second stator 20 to pass therethrough in a non-contact manner.

Near one end opening $h_1$ of the through hole h, that is, in an area of the first through hole 32, the first positioning part 34 is formed as a plurality of (here, five) ridges 34*a* that protrude radially inward from the inner wall surface 32*a*, extend in the axis line S direction, and are arranged at equal intervals in a circumferential direction. The first positioning part 34 is formed so that a protruding end 34*a*1 thereof is flush with the inner wall surface 33*a* of the second through hole 33.

The first positioning part 34 allows the outer peripheral fitting part 13 of the first stator 10 to be fitted thereinto, thereby positioning the first stator 10 on the axis line S, that is, aligning a center line of the inner peripheral surface 11*a* on the axis line S.

Near the other end opening $h_2$ of the through hole h, that is, in an area of the second through hole 33, the second positioning part 35 is formed as a plurality of (here, five) ridges 35*a* that protrude radially inward from the inner wall surface 33*a*, extend in the axis line S direction, and are arranged at equal intervals in the circumferential direction.

The second positioning part 35 allows the outer peripheral fitting part 24 of the second stator 20 to be fitted thereinto, thereby positioning the second stator 20 on the axis line S, that is, aligning center lines of the inner peripheral surface 21*a*, the insertion hole 22, and the guide holes 21*c* and $B_1$ on the axis line S.

The flange 36 is formed in an annular plate shape centered on the axis line S, and is arranged to face the flange 14 of the first stator 10 with the outer cover member 50 interposed therebetween. The flange 36 includes fitting holes 36*a* and 36*b* into which the terminals 41 and 42 respectively connecting ends 40*a* and 40*b* of the coil 40 are fitted.

The flange 37 is formed in an annular plate shape centered on the axis line S, and is arranged to face the flat plate member 70 with the outer cover member 50 interposed therebetween. The flange 37 includes a protruding cylindrical part 37*a* centered on the axis line S in order to directly contact the flat plate member 70.

The coil 40 is an excitation solenoid that generates magnetic force by being energized. The coil 40 is wound around the cylindrical part 31 of the bobbin 30, and has the ends 40*a* and 40*b* thereof pulled out from the wound portion and connected to the two terminals 41 and 42, respectively.

The outer cover member 50 is obtained in the following manner. A module product in which the coil 40 is wound around the bobbin 30 and the terminals 41 and 42 are connected to the ends 40*a* and 40*b*, while being arranged within a mold, is subjected to molding (insert molding) using a resin material so that the entire module product is covered. The outer cover member 50 includes an annular recess 51, an annular end 52, and a connector 53.

The annular recess 51 is formed so that the annular seal member $Sr_1$ is arranged on one end side in the axis line S direction.

The annular seal member $Sr_1$ is an O-ring made of a rubber material, is fitted into the annular recess 51, and is interposed between the outer cover member 50 of the bobbin module Bm and the flange 14 of the first stator 10 in the axis line S direction.

The annular end 52 is formed to contact the flat plate member 70 on the other end side in the axis line S direction. The connector 53 is formed to surround the terminals 41 and 42 and expose the terminals 41 and 42 inside.

The cylindrical member 60 functions as a magnetic path through which a line of magnetic force passes, and is formed into a cylindrical shape centered on the axis line S by machining such as cutting and rolling using an iron plate made of soft iron or the like. As shown in FIG. 1 to FIG. 5, the cylindrical member 60 includes: a connecting part 61; an arc-shaped end face 62, four crimping pieces 63, a notch 64 on one end side in the axis line S direction; and an annular end face 65 on the other end side in the axis line S direction.

The connecting part 61 is obtained by subjecting an iron plate piece which has been cut into a predetermined shape in advance to rolling into a cylindrical shape, and then engaging a concave part with a convex part and connecting them into a puzzle shape.

The arc-shaped end face 62 is an area to which the joint surface 14*b* of the flange 14 included in the first stator 10 is closely joined.

The crimping piece 63 is crimped by pressing the flange 14 of the first stator 10 from the outside with the flange 14 joined to the arc-shaped end face 62.

The notch 64 is formed in a rectangular shape in order to expose the connector 53 of the bobbin module Bm.

The annular end face 65 is an area closely joined to an annular joint surface 73 of the flat plate member 70.

In a state in which the joint surface 14*b* of the flange 14 of the first stator 10 is joined to the arc-shaped end face 62, the cylindrical member 60 is fixed to the first stator 10 by the crimping piece 63 being crimped. That is, the cylindrical member 60 forms a magnetic path leading to the first stator 10 via the arc-shaped end face 62. Here, since the cylindrical member 60 is formed by cutting and rolling or the like, the cost can be reduced compared to cutting and forging or the like.

The flat plate member 70 is formed by machining such as cutting using an iron plate made of soft iron or the like to have a substantially diamond-shaped outline. As shown in FIG. 1 to FIG. 5, the flat plate member 70 includes: the central hole 71; the annular joint surface 72 located in a peripheral area of the central hole 71; the annular joint surface 73 located concentrically with the annular joint surface 72; and two circular holes 74 through which bolts for fastening pass.

The central hole 71 is formed as a circular hole centered on the axis line S, and has an inner diameter allowing the fitting part 26 of the second stator 20 to be closely fitted thereinto.

The annular joint surface 72 is closely joined to the annular end face 25*a* of the collar 25 of the second stator 20.

The annular joint surface 73 is closely joined to the annular end face 65 of the cylindrical member 60.

In the flat plate member 70, with the fitting part 26 of the second stator 20 fitted into the central hole 71 and the annular joint surface 72 joined to the annular end surface 25*a*, the peripheral area of the central hole 71 is subjected to laser welding and fixed to the second stator 20. In the flat plate member 70, with the annular joint surface 73 joined to the annular end face 65 of the cylindrical member 60, a peripheral area of the annular end face 65 is subjected to laser welding and fixed to the cylindrical member 60.

That is, the flat plate member 70 is interposed between the second stator 20 and the cylindrical member 60 and forms a magnetic path, and also serves as a flange member for attachment to the application object.

Here, since the cylindrical member 60 and the flat plate member 70 are separately formed and then integrally fixed by welding or the like, the cost can be reduced compared to a case where the cylindrical member 60 and the flat plate member 70 are integrally formed by cutting or forging or the like.

A shown in FIG. 4, FIG. 5, FIG. 12, and FIG. 13, the mover 80 includes the plunger 81, and the shaft 82 fixed to the plunger 81.

The plunger 81 functions as a magnetic path through which a line of magnetic force passes, and also functions as a movable iron core that moves in the axis line S direction when the coil 40 is energized. The plunger 81 is formed into a bottomed cylindrical shape by machining or forging using a magnetic material such as, for example, free-cutting steel (SUM).

The plunger 81 includes the outer peripheral surface 81*a*, the tip side outer diameter part 81*b*, the end face 81*c*, a fitting hole 81*d*, a guide inner wall surface 81*e*, a bottom wall 81*f*, and an opening 81*g*.

The outer peripheral surface 81*a* is a cylindrical surface centered on the axis line S, and faces the inner peripheral surface 11*a* of the first stator 10 with a predetermined gap therebetween.

The tip side outer diameter part 81*b* is formed to have the same outer diameter as the outer peripheral surface 81*a*, and faces the inner peripheral surface 21*a* with a predetermined gap therebetween while entering the recess 21 of the second stator 20.

The end face 81*c* is formed as an annular plane perpendicular to the axis line S, and contacts the stopper 21*b* of the second stator 20 at the operating position.

The fitting hole 81*d* is a cylindrical hole centered on the axis line S, and is formed so that a fitting part 82*a* of the shaft 82 is press-fitted therein.

The guide inner wall surface 81*e* is a cylindrical surface having the same inner diameter as the fitting hole 81*d* and centered on the axis line S, and slidably guides a rod 91 included in the buffer unit 90 in the axis line S direction.

The bottom wall 81*f* contacts a contact part 91*c* of the rod 91 included in the buffer unit 90 in the axis line S direction and prevents the contact part 91*c* from coming off.

The opening 81*g* is a circular hole centered on the axis line S, and allows a protrusion 91*b* of the rod 91 to protrude to the outside.

Here, since the plunger 81 is arranged in a non-contact manner with a gap with the inner peripheral surface 11*a* of the first stator 10, mutual attraction when the coil 40 is energized is suppressed or prevented, and smooth movement with excellent responsiveness can be achieved by attraction with the second stator 20.

The shaft 82 exerts a driving force on the application object, and is formed in a long columnar shape in the axis line S direction using a nonmagnetic material such as, for example, stainless steel. The shaft 82 includes the fitting part 82*a*, a shank 82*b*, a free end 82*c*, an end face 82*d*, and a receiving part 82*e*.

The fitting part 82*a* is an area fitted into the fitting hole 81*d* of the plunger 81, and is formed to have a larger outer diameter than the shank 82*b*.

The shank 82*b* extends in the axis line S direction, is inserted into the insertion hole 22 of the second stator 20 in a non-contact manner, and is slidably guided by the guide holes 21*c* and $B_1$ of the second stator 20.

The free end 82*c* is arranged to protrude outward from the insertion hole 22 of the second stator 20 and face the recess 27*b* at the rest position.

The end face 82*d* is arranged to face the inside of the plunger 81, and a buffer member 93 of the buffer unit 90 removably contacts the end face 82*d*.

The receiving part 82*e* is formed as an annular end face centered on the axis line S in order to receive one end 92*a* of an energization member 92.

As shown in FIG. 4, FIG. 5, FIG. 12, and FIG. 13, the buffer unit 90 is held by the plunger 81 of the mover 80, and positions the mover 80 in the rest position while absorbing impact when the mover 80 returns to the rest position. The buffer unit 90 includes the rod 91, the energization member 92, and the buffer member 93.

The rod 91 is made of stainless steel or the like, and includes a main body 91*a*, the protrusion 91*b*, the contact part 91*c*, a receiving part 91*d*, and a fitting part 91*e*.

The main body 91*a* is formed in a columnar shape centered on the axis line S in order to slidably contact the guide inner wall surface 81*e* of the plunger 81.

The protrusion 91*b* is arranged to protrude from the opening 81*g* of the plunger 81, and is formed in a columnar shape centered on the axis line S and having a smaller diameter than the main body 91*a* in order to removably contact the stopper (inner wall surface 12*a*) of the first stator 10.

The contact part 91*c* removably contacts the bottom wall 81*f* of the plunger 81 in the axis line S direction.

The receiving part 91*d* is formed as an annular end face centered on the axis line S in order to receive the other end 92*b* of the energization member 92.

The fitting part 91*e* is formed in a columnar shape centered on the axis line S in order to be fitted into a fitting recess 93*a* of the buffer member 93 and position the buffer member 93 in the direction perpendicular to the axis line S.

The energization member 92 is a compression type coil spring. The energization member 92 is compressed and arranged in the axis line S direction with the one end 92*a* in contact with the receiving part 82*e* of the shaft 82 and the other end 92*b* in contact with the receiving part 91*d* of the rod 91. The energization member 92 energizes the rod 91 to contact the bottom wall 81*f* in the axis line S direction.

That is, in the electromagnetic actuator that has been assembled, the energization member 92 energizes the rod 91 toward the first stator 10.

Here, an energizing force of the energization member 92 is set to be greater than a return force exerted by the application object. Accordingly, the energization member 92 resists the return force of the application object and positions the mover 80 in the predetermined rest position.

Figure 12:
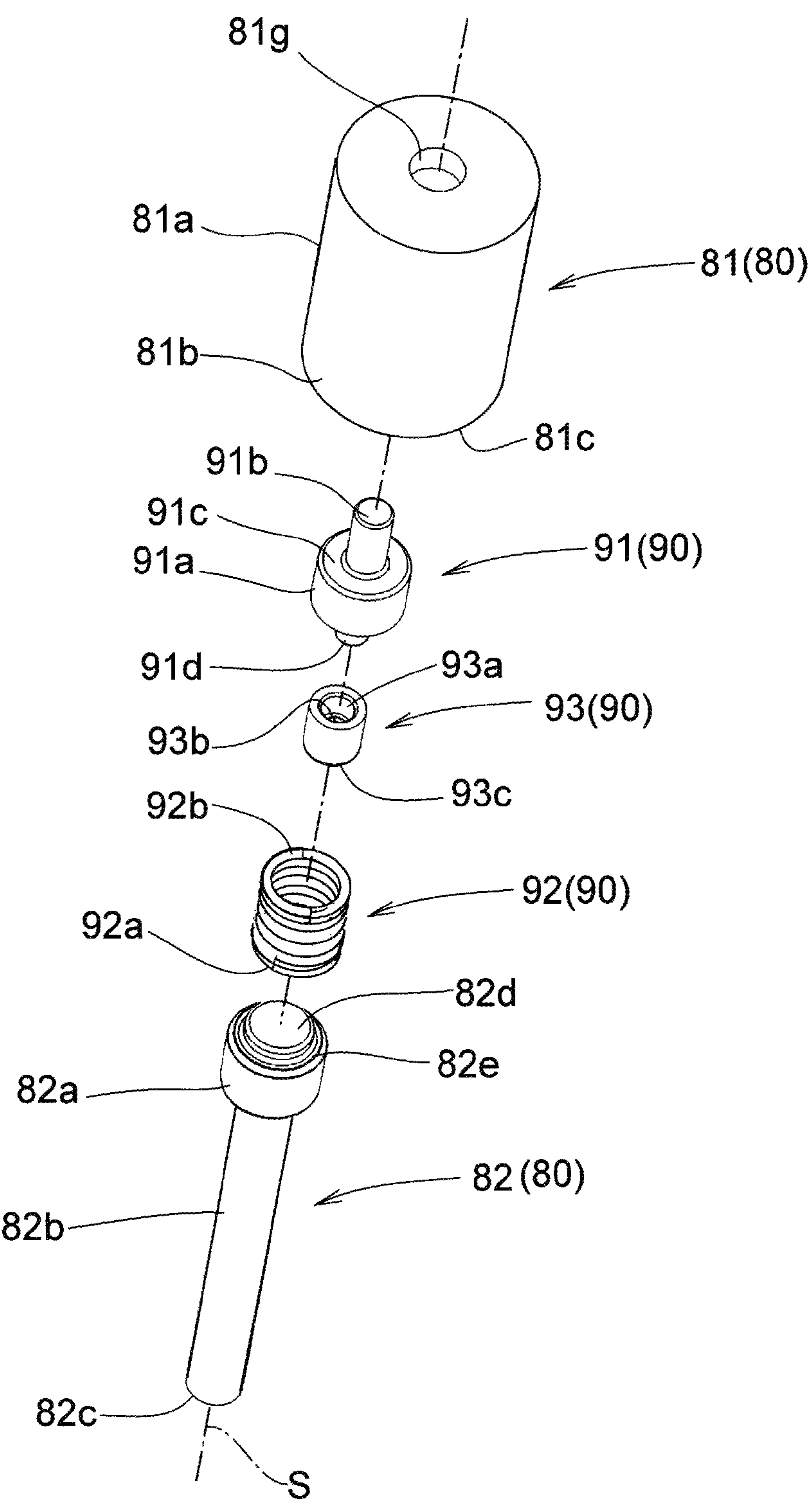
FIG. 12 is an exploded perspective view of a mover included in the electromagnetic actuator according to the first embodiment.
Figure 13:
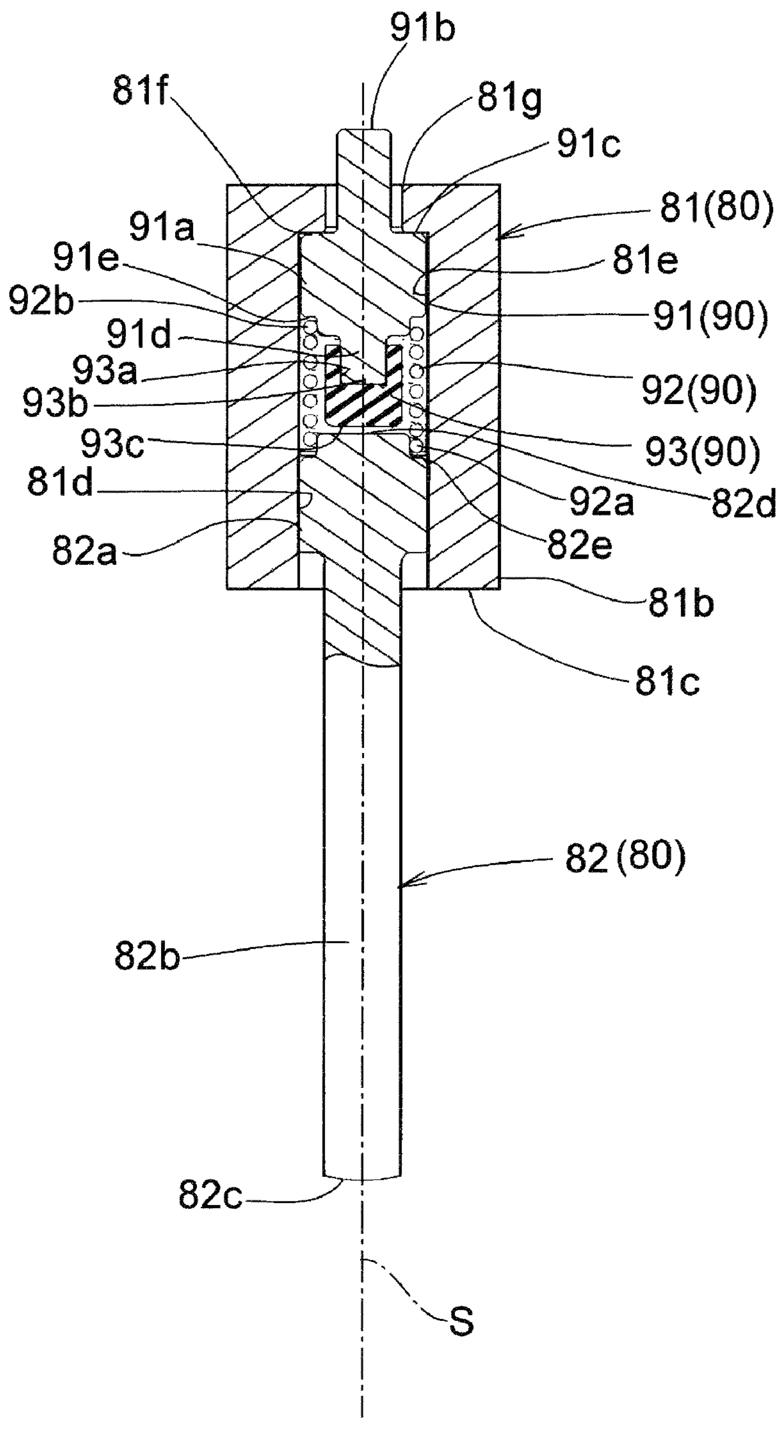
FIG. 13 is a cross-sectional view of the mover included in the electromagnetic actuator according to the first embodiment, taken along a plane including the axis line.

The buffer member 93 is formed in a columnar shape using a material that can absorb impact, for example, a rubber material. As shown in FIG. 12 and FIG. 13, the buffer member 93 includes the fitting recess 93*a*, a bottom surface 93*b*, and an end face 93*c*.

The fitting recess 93*a* is formed so that the fitting part 91*e* of the rod 91 is fitted thereinto, and an end face of the fitting part 91*e* contacts the bottom surface 93*b*. In this way, in a state in which the buffer member 93 has been assembled to the rod 91 in advance by fitting the fitting part 91*e* into the fitting recess 93*a*, by inserting the buffer member 93 into the plunger 81 together with the rod 91, assembly work can be easily performed. The buffer member 93 can be positioned in the direction perpendicular to the axis line S, and interference with the energization member 92 can be prevented.

The end face 93*c* is formed as a plane perpendicular to the axis line S, and is arranged to face the end face 82*d* of the shaft 82.

In the assembled state, that is, in a rest state in which the mover 80 is located in the rest position, the buffer member 93 is arranged so that a slight gap is formed between the end face 93*c* and the end face 82*d*. This gap is for absorbing a dimensional error in manufacturing of the buffer member 93 or other members, and is able to achieve a desired buffering effect by preventing the buffer member 93 from being compressed in the rest state.

Next, the assembly work of the electromagnetic actuator is described.

First, the following work is performed on a sub-line.

The buffer unit 90 is incorporated into the plunger 81, the shaft 82 is press-fitted from the outside, and the mover 80 provided with the buffer unit 90 is formed.

The stopper 21*b* and the bearing B are incorporated into the second stator 20.

A module product in which the coil 40 is wound around the bobbin 30 and the terminals 41 and 42 are respectively connected to ends 40*a* and 40*b* of the coil 40 is arranged within a mold, the outer cover member 50 is molded by a resin material, and the bobbin module Bm is formed.

Figure 3:
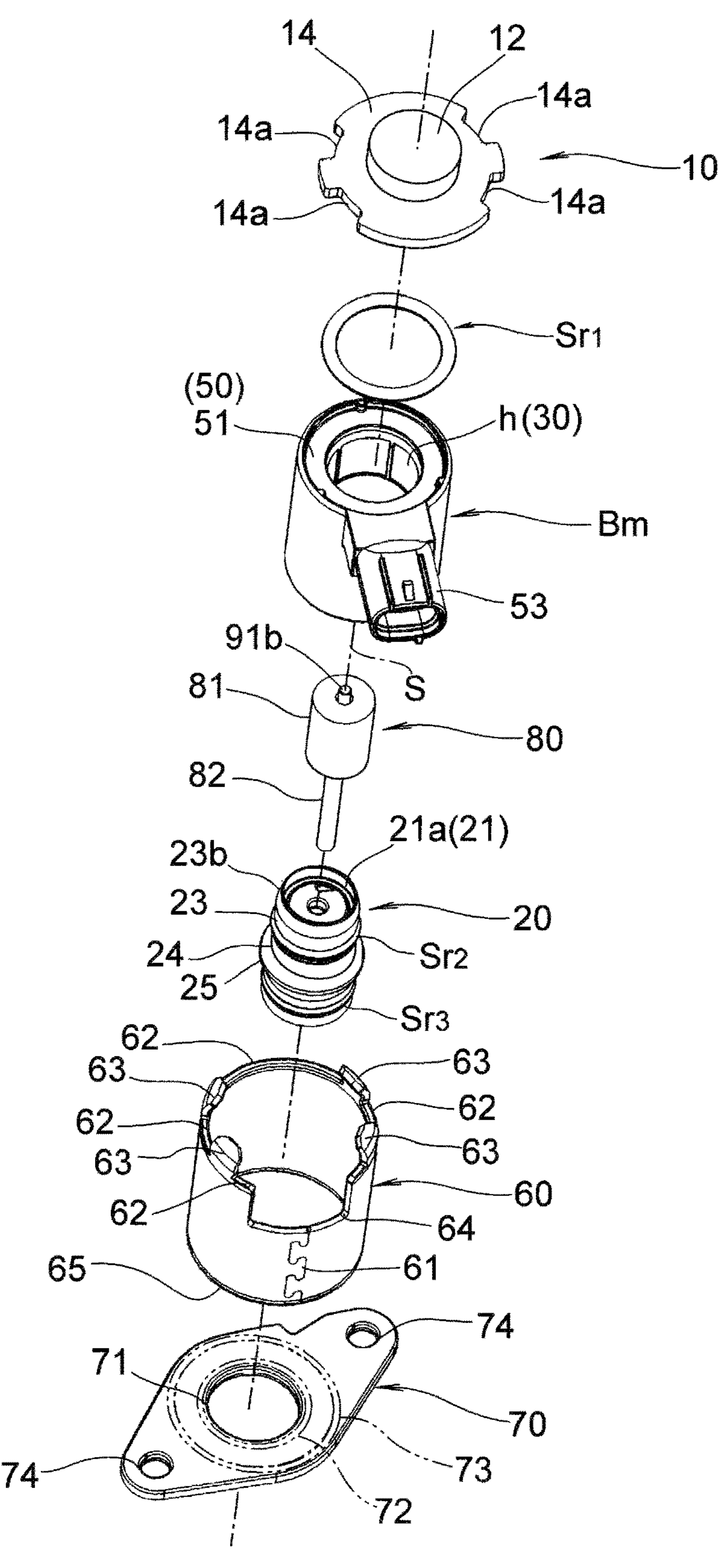
FIG. 3 is an exploded perspective view of the electromagnetic actuator according to the first embodiment.

Next, on a main line, as shown in FIG. 3, the first stator 10, the second stator 20, the bobbin module Bm, the cylindrical member 60, the flat plate member 70, the mover 80, and the annular seal members $Sr_1$, $Sr_2$, and $Sr_3$ are prepared.

First, the flat plate member 70 is fixed to the second stator 20. That is, the fitting part 26 of the second stator 20 is fitted into the central hole 71 of the flat plate member 70, and the annular joint surface 72 is joined to the annular end face 25*a* of the collar 25. Then, laser welding is performed in a boundary area (peripheral area of the central hole 71) between the fitting part 26 and the central hole 71, and the flat plate member 70 is fixed to the second stator 20.

Subsequently, the cylindrical member 60 is fixed to the flat plate member 70. That is, the annular end face 65 of the cylindrical member 60 is joined to the annular joint surface 73 of the flat plate member 70. Then, laser welding is performed in a boundary area (peripheral area of the annular end face 65) between the annular end face 65 and the annular joint surface 73, and the cylindrical member 60 is fixed to the flat plate member 70.

Subsequently, the first stator 10 is fixed to the bobbin module Bm. That is, the annular seal member $Sr_1$ is fitted into the annular recess 51 of the outer cover member 50. Then, the cylindrical part 11 of the first stator 10 is inserted into the first through hole 32 of the bobbin 30 to a predetermined position, and the outer peripheral fitting part 13 of the first stator 10 is fitted into the first positioning part 34.

Accordingly, the center line of the inner peripheral surface 11*a* of the first stator 10 is positioned on the axis line S. The annular seal member $Sr_1$ is pressed by the flange 14 of the first stator 10, and blocks the gap between the inner wall surface 32*a* of the first through hole 32 of the bobbin 30 and the outer peripheral surface 11*b* of the first stator 10 so as to prevent the gap from communicating with the outside.

Subsequently, the mover 80 and the annular seal member $Sr_2$ are assembled to the second stator 20. That is, the annular seal member $Sr_2$ is fitted into the annular groove 23*a* of the second stator 20. The shaft 82 of the mover 80 is inserted into the insertion hole 22 of the second stator 20 and also slidably inserted into the guide holes 21*c* and $B_1$, and is maintained in a state in which the end face 81*c* is in contact with the stopper 21*b*.

Subsequently, the second stator 20 is fixed to the bobbin module Bm to which the first stator 10 is assembled. That is, with the second stator 20 to which the cylindrical member 60 and the flat plate member 70 are assembled fixed with a jig or the like, the bobbin module Bm is inserted inside the cylindrical member 60, the second stator 20 is inserted into the second through hole 33 of the bobbin 30, and the outer peripheral fitting part 24 of the second stator 20 is fitted into the second positioning part 35.

Accordingly, the center lines of the inner peripheral surface 21*a* and the insertion hole 22 of the second stator 20 and the guide holes 21*c* and $B_1$ are positioned on the axis line S.

An end face (annular end 52 and protruding cylindrical part 37*a*) of the bobbin module Bm contacts the flat plate member 70, and the flange 14 (joint surface 14*b*) of the first stator 10 is joined to the arc-shaped end face 62 of the cylindrical member 60.

Furthermore, the annular seal member $Sr_2$ closely contacts the inner wall surface 33*a* of the second through hole 33 of the bobbin 30, and blocks the gap between the inner wall surface 33*a* of the second through hole 33 of the bobbin 30 and the outer peripheral surface 23 of the second stator 20 so as to prevent the gap from communicating with the outside.

Subsequently, the first stator 10 is fixed to the cylindrical member 60. That is, the four crimping pieces 63 are crimped so as to press the flange 14 of the first stator 10 from the outside.

The annular seal member $Sr_3$ is fitted into the annular groove 27*a* of the fitting part 27 of the second stator 20. Alternatively, the annular seal member $Sr_3$ may be fitted into the annular groove 27*a* in advance at a stage of preparing the second stator 20. Accordingly, the assembly of the electromagnetic actuator is completed.

The annular seal member $Sr_3$ may be fitted into the annular groove 27*a* of the fitting part 27 when the electromagnetic actuator is applied to the application object.

The above procedure of the assembly work is an example. The work may be performed on one assembly line without distinction between the sub-line and the main line, or other methods may be adopted for procedures including preparations or the like.

In this electromagnetic actuator, in a state before being applied to the application object, the mover 80 is movable in the axis line S direction between the rest position (position where the rod 91 contacts the inner wall surface 12*a*) and the operating position (position where the end face 81*c* contacts the stopper 21*b*).

Figure 4:
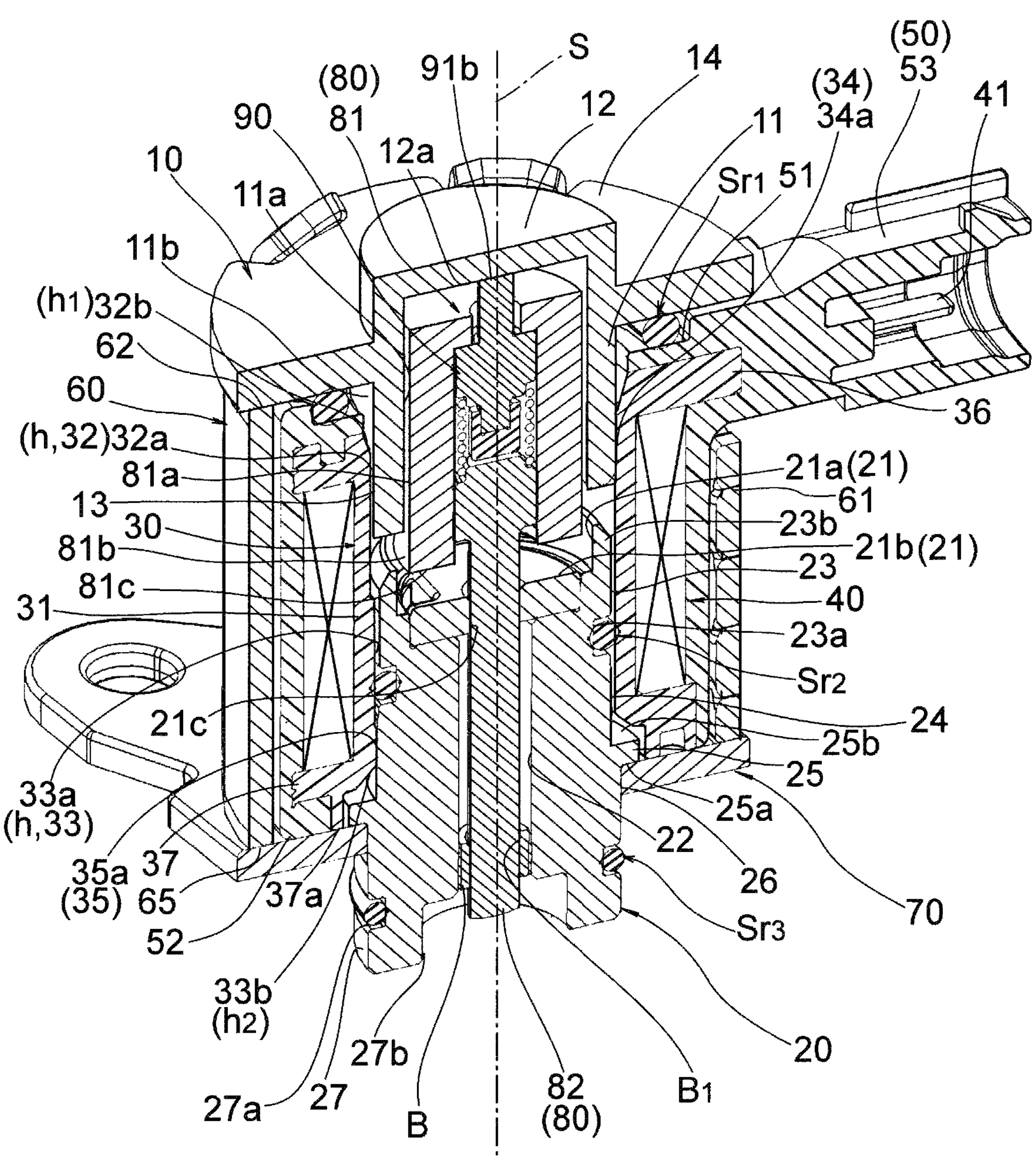
FIG. 4 is a perspective cross-sectional view of the electromagnetic actuator according to the first embodiment.
Figure 5:
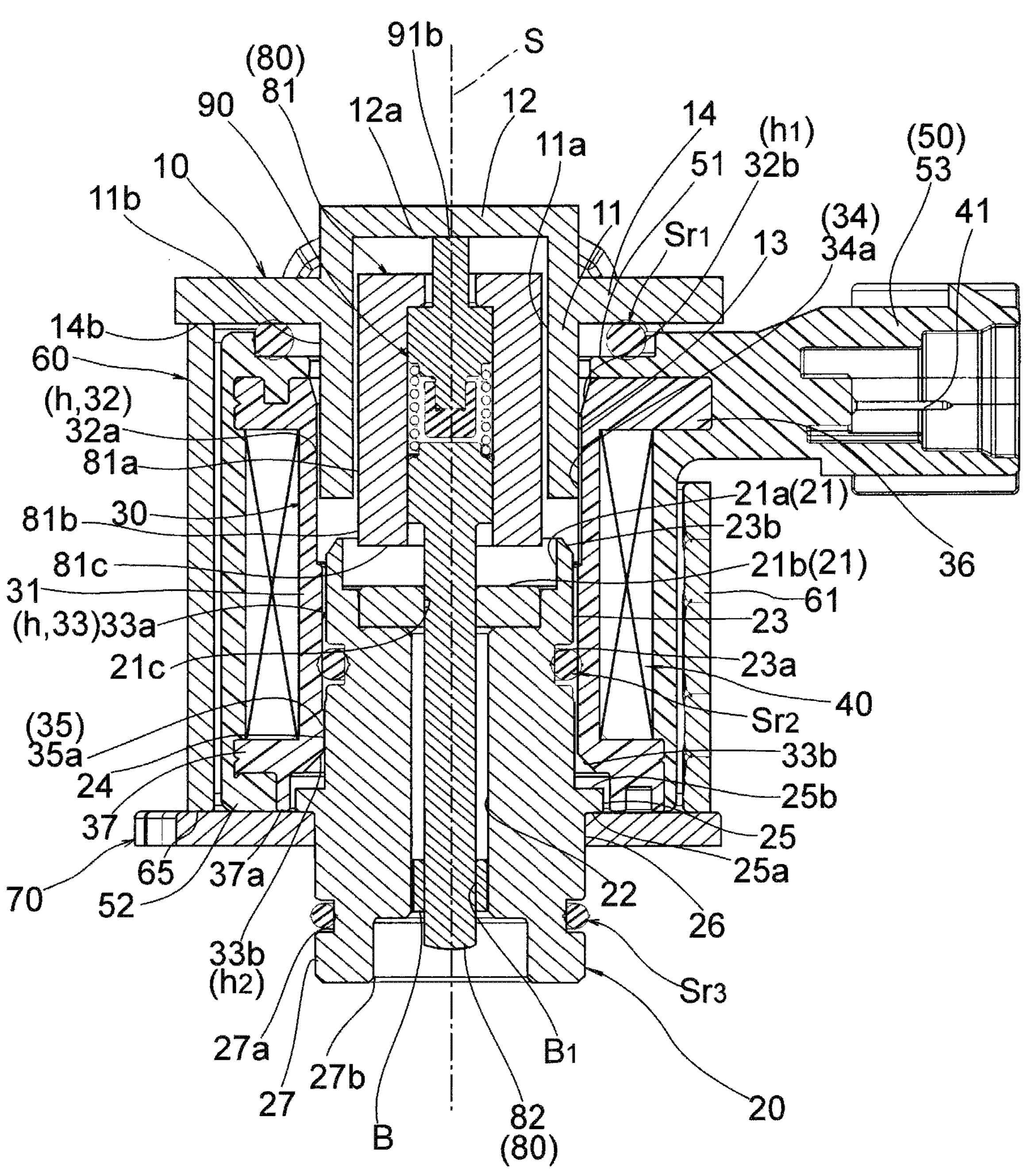
FIG. 5 is a cross-sectional view of the electromagnetic actuator according to the first embodiment, taken along a plane including an axis line.

When the electromagnetic actuator is attached to the application object, due to the return force of an energization member provided on the application object, the shaft 82 is energized to retreat, and the protrusion 91*b* of the rod 91 is held at the rest position in contact with the inner wall surface 12*a* of the first stator 10, as shown in FIG. 4 and FIG. 5.

Figure 15:
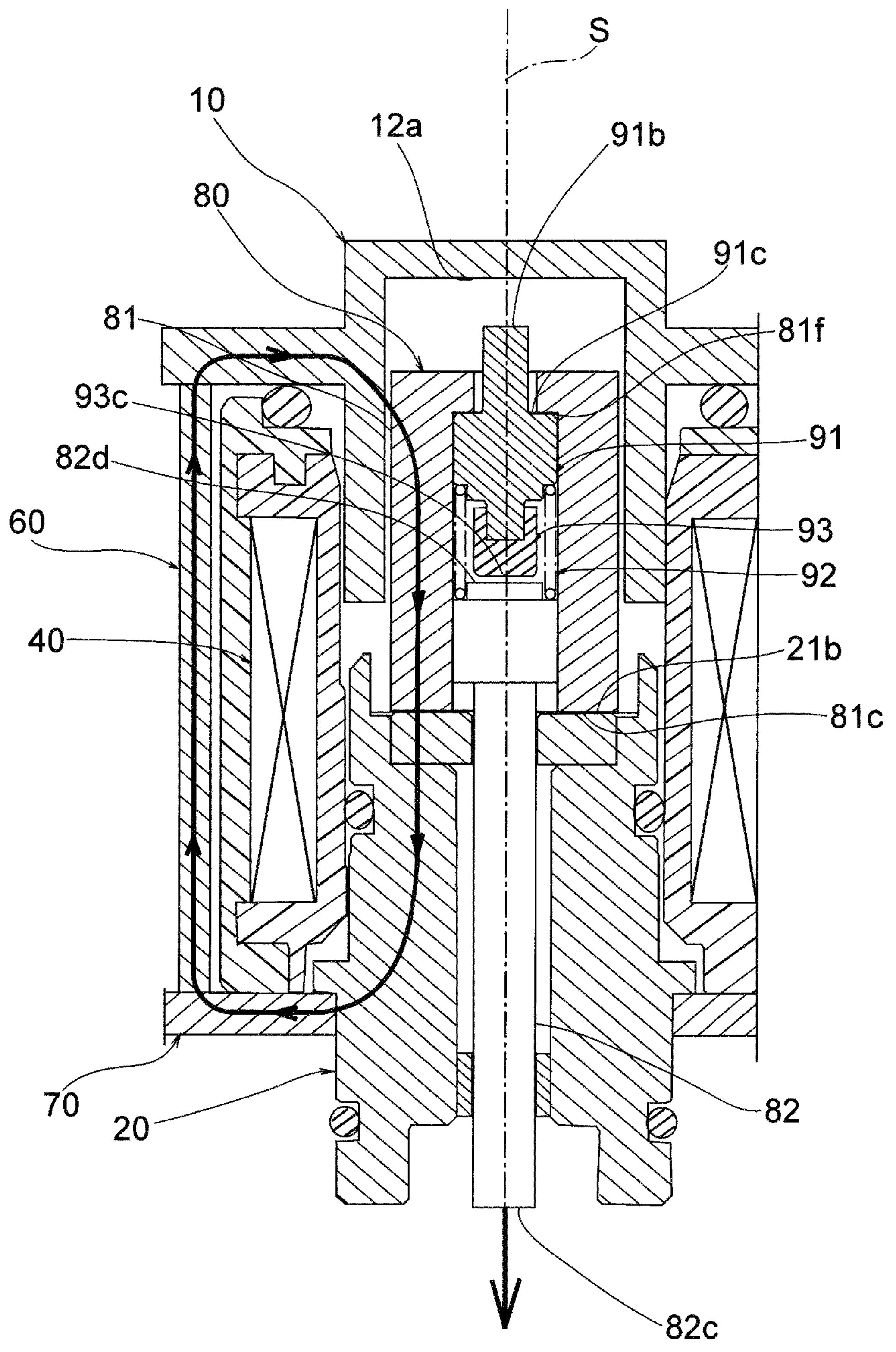
FIG. 15 describes an operation of the electromagnetic actuator according to the first embodiment, and is a partial cross-sectional view showing a state in which the mover is located in an operating position.
Figure 16:
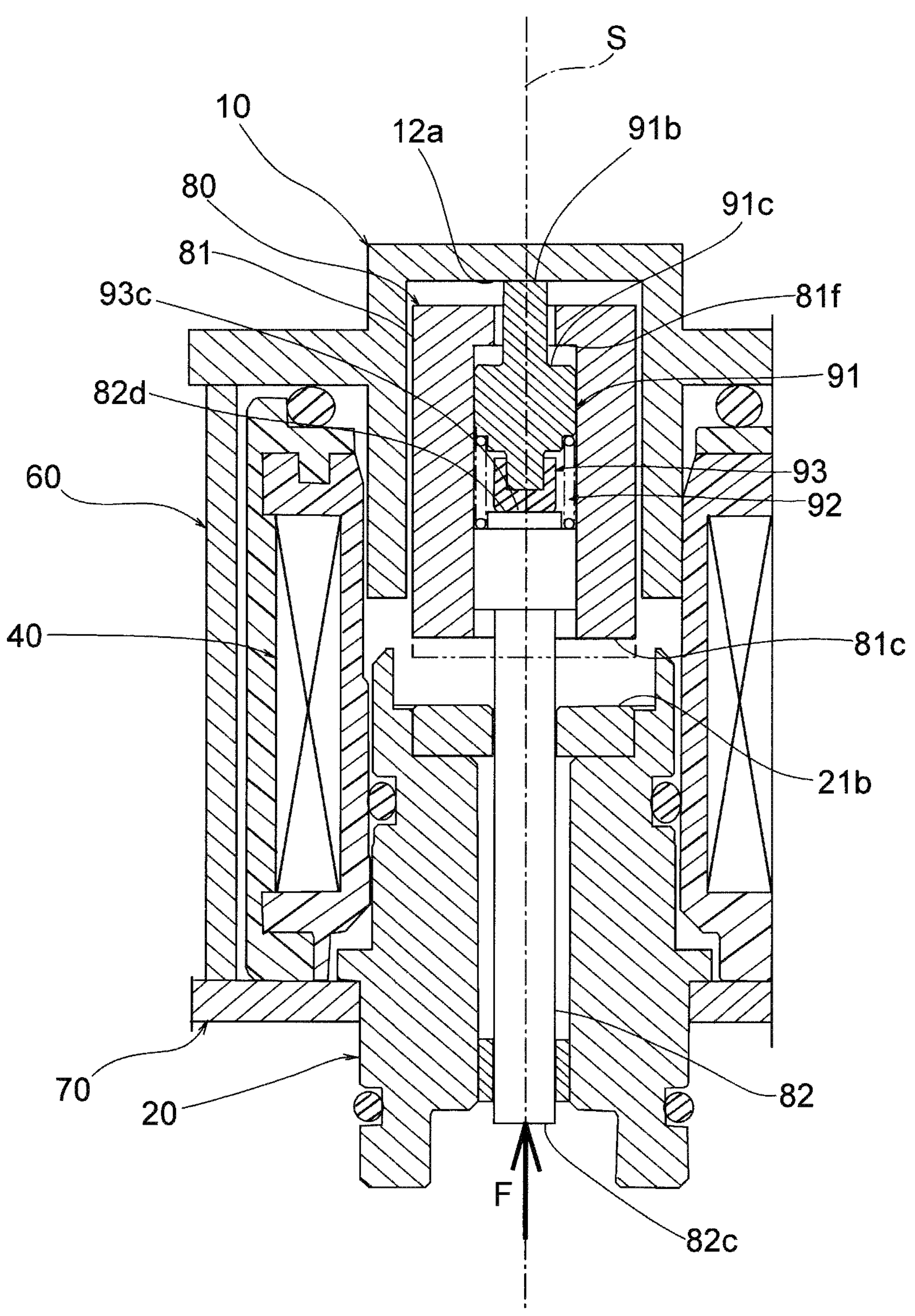
FIG. 16 describes an operation of the electromagnetic actuator according to the first embodiment, and is a partial cross-sectional view showing a state in which the mover returns from the operating position to the rest position.

Next, an operation of the electromagnetic actuator in the state of being applied to the application object is described with reference to FIG. 14 to FIG. 16.

Figure 14:
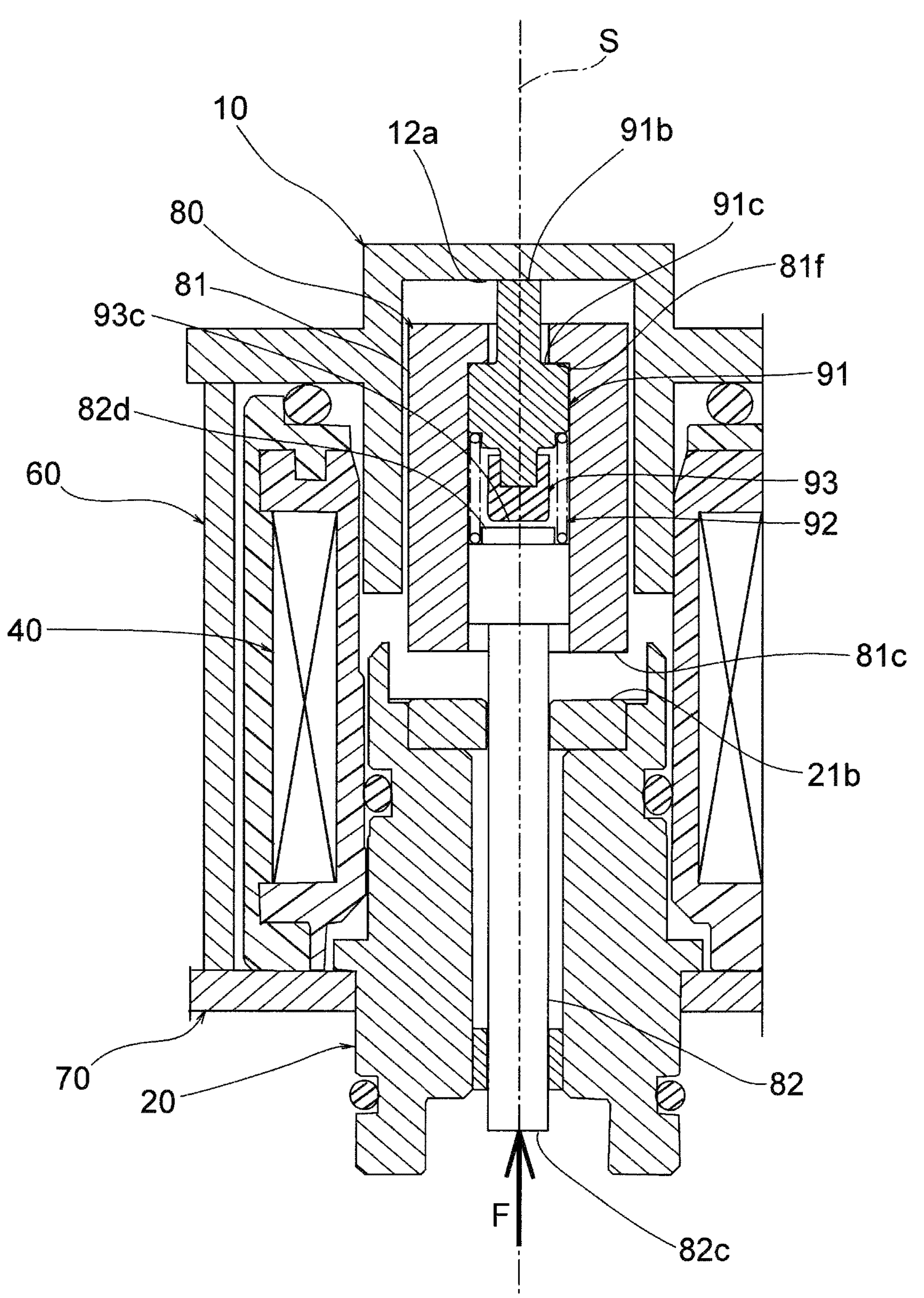
FIG. 14 describes an operation of the electromagnetic actuator according to the first embodiment, and is a partial cross-sectional view showing a state in which the mover is located in a rest position.

First, as shown in FIG. 14, in a non-energized state in which the coil 40 is not energized, the mover 80 is pushed back by a return force F exerted by the application object, and is positioned in the rest position where the protrusion 91*b* of the rod 91 is in contact with the bottom wall 12 (inner wall surface 12*a*).

In this rest state, when the coil 40 is energized, a line of magnetic force (electromagnetic force) is generated that flows from the cylindrical part 11 of the first stator 10 into the second stator 20 via the plunger 81 of the mover 80, and the plunger 81 is drawn toward the second stator 20. As shown in FIG. 15, the end face 81*c* of the plunger 81 moves to the operating position where it contacts the stopper 21*b* of the second stator 20 and stops, a driving force is applied to the application object and an operation such as switching is performed.

On the other hand, in this operating state, when the coil 40 is de-energized, the mover 80 is pushed back by the return force F exerted by the application object and retreats toward the rest position. During this retreat, first, the protrusion 91*b* of the rod 91 contacts the bottom wall 12 (inner wall surface 12*a*). As shown in FIG. 16, the mover 80 overtravels beyond the predetermined rest position (chain double-dashed line in FIG. 16) due to inertial force, and the buffer member 93 is elastically deformed between the rod 91 and the shaft 82. During this movement, an impact force of the plunger 81 (that is, mover 80) which moves integrally with the shaft 82 is absorbed.

Due to the energizing force of the energization member 92, the mover 80 that has overtraveled is pushed back in an opposite direction and stops at the predetermined rest position, as shown in FIG. 14.

In this way, due to the action of the buffer unit 90 (rod 91, energization member 92, and buffer member 93), the impact force when the mover 80 returns to the rest position is absorbed, and the mover 80 is positioned in the predetermined rest position with high accuracy.

According to the electromagnetic actuator according to the first embodiment, since the bobbin 30 includes: the through hole h (first through hole 32 and second through hole 33), through which the first stator 10 and the second stator 20 pass in a non-contact manner; and the positioning part (first positioning part 34 and second positioning part 35), partially formed in the through hole h, allowing the first stator 10 and the second stator 20 to be fitted thereinto, and positioning the first stator 10 and the second stator 20 on the axis line S, compared to a case where a dedicated positioning member (collar) is adopted as conventionally, the structure can be simplified, the cost can be reduced and the number of parts can be reduced. In particular, since a portion of the through hole h is used as the fitting part for positioning instead of that the entire area of the through hole of the bobbin is used as the fitting part, fitting work can be smoothly performed. The occurrence of excessive fitting stress in the bobbin can be suppressed, and damage to the bobbin or the like can be prevented.

By adopting, as the positioning part, the plurality of ridges 34*a* and 35*a* that protrude from the inner wall surfaces 32*a* and 33*a* of the through hole h (first through hole 32 and second through hole 33) and extend in the axis line S direction, fitting work can be relatively smoothly performed.

By adopting the first through hole 32 and the second through hole 33 that is adjacent to the first through hole 32 and has a smaller diameter than the first through hole 32 as the through hole h, forming the first positioning part 34 in the area of the first through hole 32 and forming the second positioning part 35 in the area of the second through hole 33, a fitting diameter (outer diameter of the outer peripheral fitting part 13) of the first stator 10 and a fitting diameter (outer diameter of the outer peripheral fitting part 24) of the second stator 20 are made different from each other. Thereby, an assembly mistake such as that the second stator 20 is fitted into the first through hole 32 and the first stator 10 is fitted into the second through hole 33 can be prevented.

Since the first positioning part 34 is formed so that the protruding end 34*a*1 is flush with the inner wall surface 33*a* of the second through hole 33, when the bobbin 30 is molded using a resin material or the like, by molding the inner wall surface 32*a* that is more concave than the inner wall surface 33*a* with the inner wall surface 33*a* as a reference, a plurality of ridges 34*a* can be easily formed, and a plurality of ridges 35*a* protruding from the inner wall surface 33*a* can be easily formed.

The first stator 10 includes: the cylindrical part 11, defining the inner peripheral surface 11*a* that receives the mover 80 (plunger 81); the bottom wall 12, blocking one end side of the cylindrical part 11 and defining the rest position of the mover 80; and the outer peripheral fitting part 13, fitted into the first positioning part 34 as the positioning part. The second stator 20 includes: the insertion hole 22, receiving the mover 80 (shaft 82) and exposing the mover 80 (shaft 82) at the tip thereof; and the outer peripheral fitting part 24, fitted into the second positioning part 35 as the positioning part. Thus, by fitting the outer peripheral fitting part 13 into the first positioning part 34 and fitting the outer peripheral fitting part 24 into the second positioning part 35, the first stator 10 and the second stator 20 can be easily positioned on the axis line S. Hence, the mover 80 can be accommodated so as to smoothly reciprocate with respect to the first stator 10 and the second stator 20.

The mover 80 includes: the plunger 81, made of a magnetic material; and the shaft 82, made of a nonmagnetic material, fixed to the plunger 81 and exerting the driving force to the outside. Since the inner peripheral surface 11*a* of the first stator 10 receives the plunger 81 in a non-contact manner to be capable of reciprocating, the insertion hole 22 of the second stator 20 receives the shaft 82 in a non-contact manner to be capable of reciprocating, and the second stator 20 includes the guide holes 21*c* and $B_1$ that slidably guide the shaft 82, the mover 80 can be accommodated so as to relatively smoothly reciprocate.

Since the second stator 20 includes the stopper 21*b* that defines the operating position of the mover 80, the operating position of the mover 80 can be defined by the electromagnetic actuator itself without depending on a structure of the application object.

As described above, according to the electromagnetic actuator according to the first embodiment, the structure can be simplified, the cost can be reduced, the number of parts can be reduced, the assembly work can be facilitated, and smooth operation of the mover can be ensured.

Figure 17:
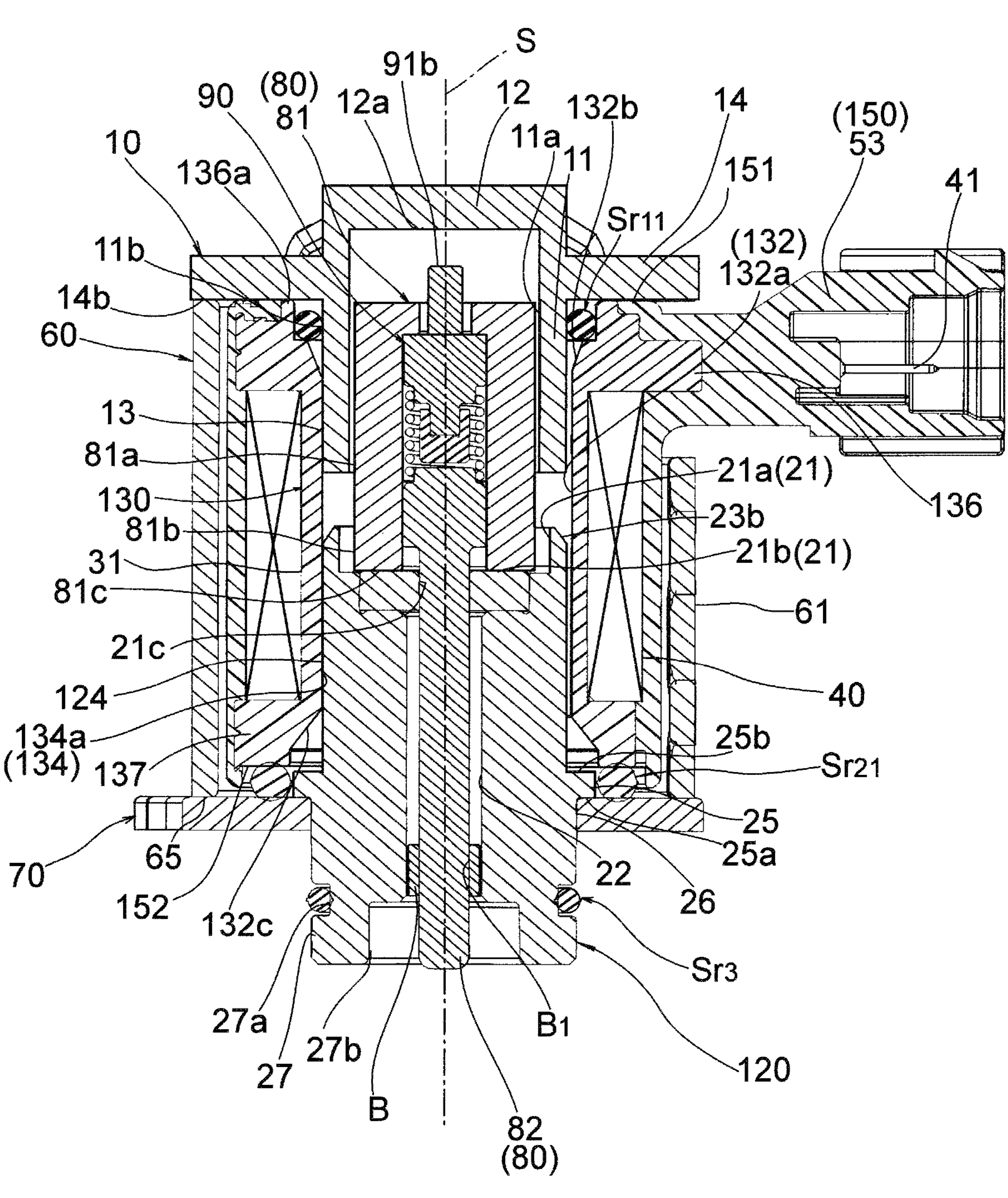
FIG. 17 is a cross-sectional view showing an electromagnetic actuator according to a second embodiment, taken along a plane including the axis line.
Figure 18:
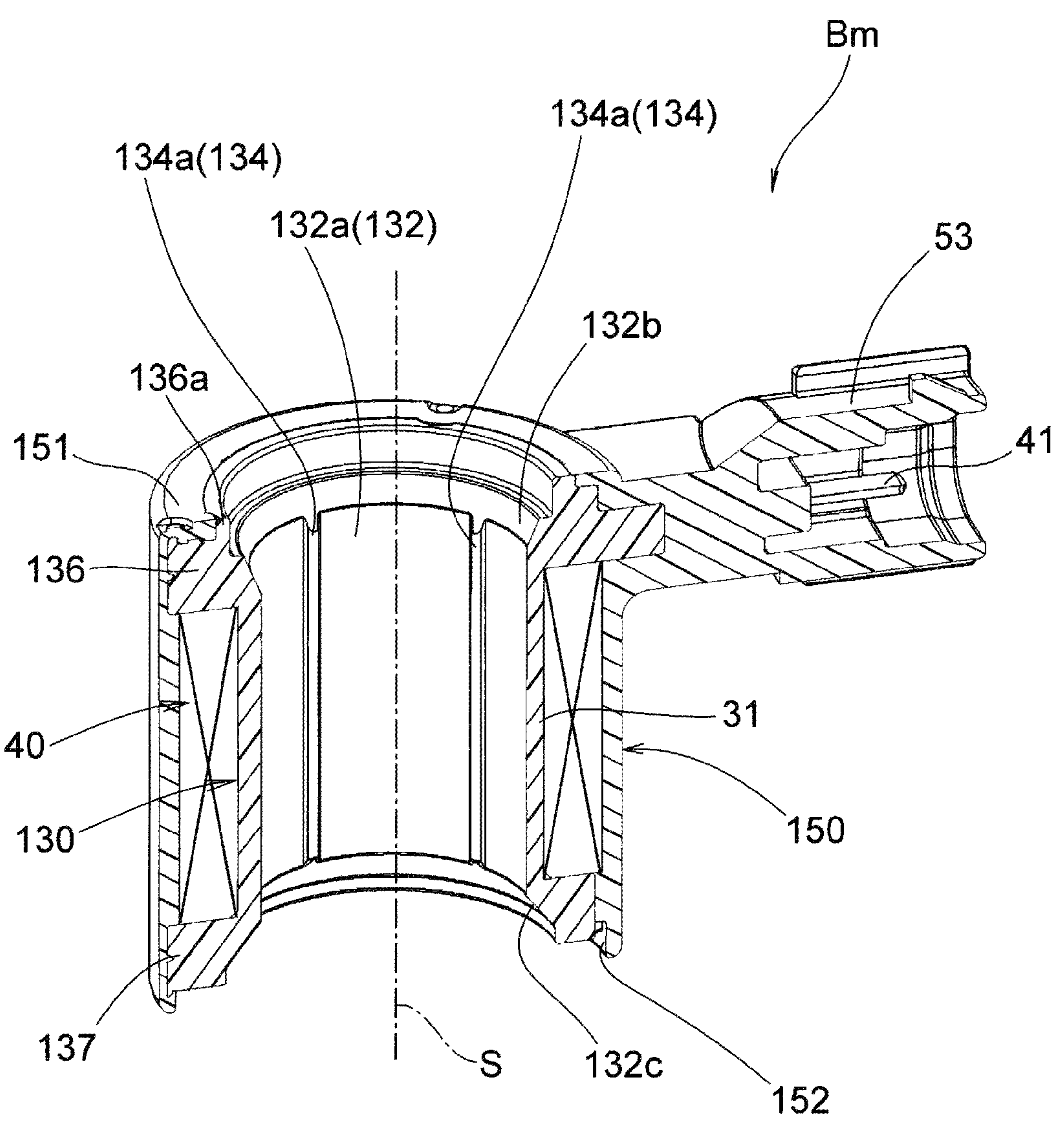
FIG. 18 is a perspective cross-sectional view of a bobbin module included in the electromagnetic actuator according to the second embodiment.
Figure 19:
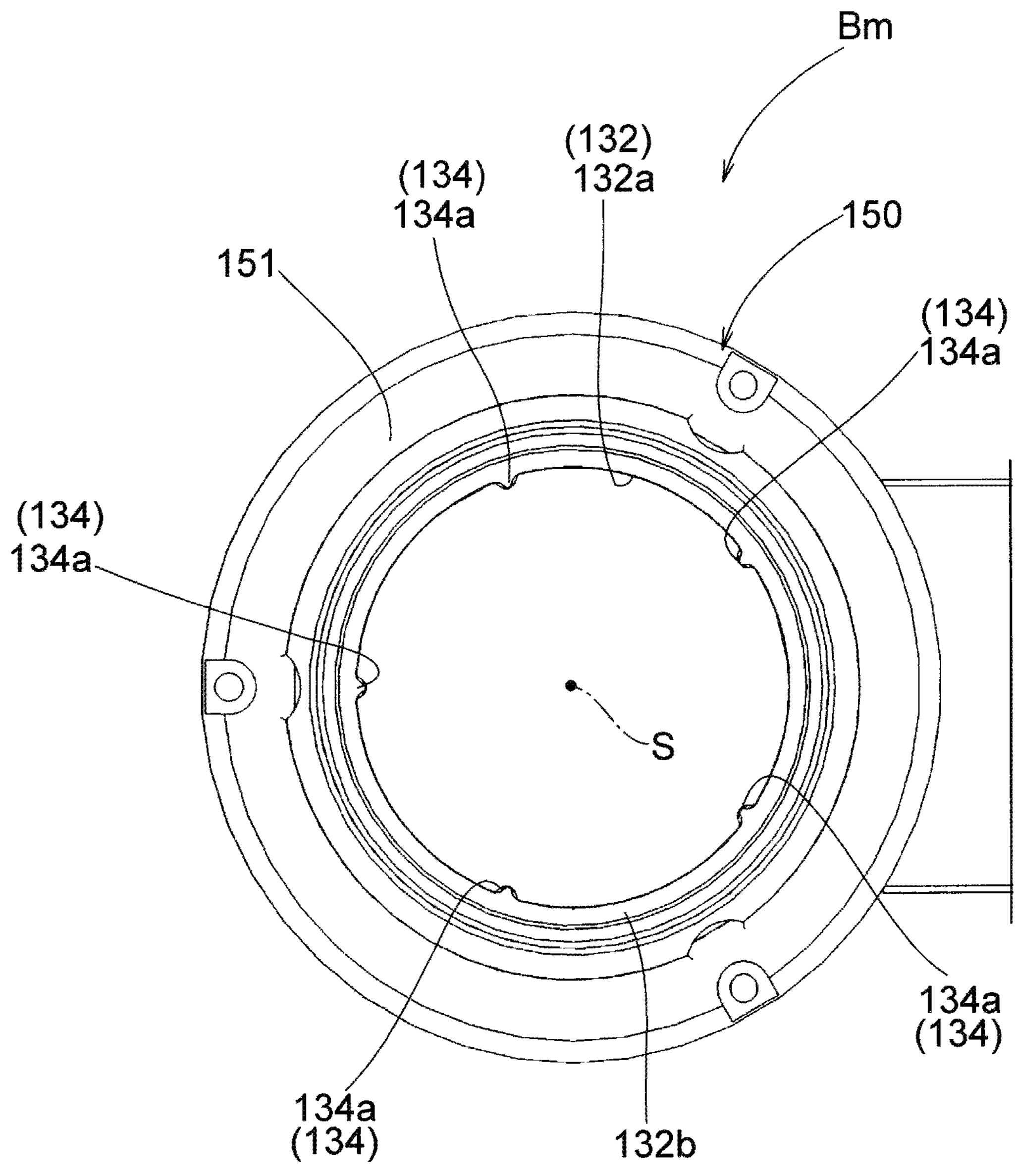
FIG. 19 is an end view of the bobbin module included in the electromagnetic actuator according to the second embodiment as seen from one side in the axis line direction.

FIG. 17 to FIG. 19 show an electromagnetic actuator according to a second embodiment of the disclosure, in which the same configurations as in the first embodiment are assigned the same reference numerals and descriptions thereof are omitted.

An electromagnetic actuator according to the second embodiment includes the first stator 10, a second stator 120, the bobbin module Bm, the cylindrical member 60, the flat plate member 70, the mover 80, the buffer unit 90, and annular seal members $Sr_{11}$, $Sr_{21}$, and $Sr_3$. Here, the bobbin module Bm includes a bobbin 130, the coil 40 for excitation, the terminals 41 and 42, and an outer cover member 150 in which the bobbin 130 and the coil 40 are embedded.

The second stator 120 is formed by machining or forging using soft iron or the like, functions as a magnetic path through which a line of magnetic force passes, and also functions as a fixed iron core that attracts the plunger 81 of the mover 80 when the coil 40 is energized. The second stator 120 includes the recess 21 (inner peripheral surface 21*a*, stopper 21*b*, and guide hole 21*c*), the insertion hole 22 (bearing B and guide hole $B_1$), the outer peripheral annular tapered surface 23*b*, an outer peripheral fitting part 124, the collar 25, and the fitting parts 26 and 27.

The fitting part 124 is formed as a cylindrical outer peripheral surface centered on the axis line S in order to be fitted into a positioning part 134 of the bobbin 130.

The bobbin 130 is made of a resin material. The bobbin 130 includes the cylindrical part 31 centered on the axis line S, a through hole 132, the positioning part 134, a flange 136, and a flange 137.

The through hole 132 defines an inner wall surface 132*a* of a cylindrical shape centered on the axis line S, an annular tapered surface 132*b*, and an annular tapered surface 132*c*. The through hole 132 is formed to allow the cylindrical part 11 and the outer peripheral fitting part 13 of the first stator 10 and the outer peripheral fitting part 124 of the second stator 120 to pass therethrough in a non-contact manner.

The positioning part 134 is formed as a plurality of (here, five) ridges 134*a* that protrude radially inward from the inner wall surface 132*a* of the through hole 132, extend in the axis line S direction, and are arranged at equal intervals in the circumferential direction.

By inserting the first stator 10 from one side of the through hole 132 and allowing the outer peripheral fitting part 13 to be fitted thereinto and inserting the second stator 120 from the other side of the through hole 132 and allowing the outer peripheral fitting part 124 to be fitted thereinto, the positioning part 134 positions the first stator 10 and the second stator 120 on the axis line S, that is, aligns center lines of the inner peripheral surface 11*a*, the inner peripheral surface 21*a*, the insertion hole 22, and the guide holes 21*c* and $B_1$ on the axis line S.

The flange 136 is formed in an annular plate shape centered on the axis line S, and is arranged to face the flange 14 of the first stator 10 with the outer cover member 150 interposed therebetween. The flange 136 includes a protruding cylindrical part 136*a* centered on the axis line S in order to directly contact the flange 14 and fit the annular seal member $Sr_{11}$ inside thereof. The flange 136 includes the fitting holes 36*a* and 36*b* into which the terminals 41 and 42 respectively connecting ends 40*a* and 40*b* of the coil 40 are fitted.

The annular seal member $Sr_{11}$ is an O-ring made of a rubber material, is fitted inside the protruding cylindrical part 136*a*, and is interposed between the bobbin 130 and the first stator 10 in the radial direction perpendicular to the axis line S.

The flange 137 is formed in an annular plate shape centered on the axis line S, and is arranged to face the flat plate member 70 with the annular seal member $Sr_{21}$ interposed therebetween in the axis line S direction.

The outer cover member 150 is obtained in the following manner. A module product in which the coil 40 is wound around the bobbin 130 and the terminals 41 and 42 are connected to the ends 40*a* and 40*b*, while being arranged within a mold, is subjected to molding (insert molding) using a resin material so that the entire module product is covered. The outer cover member 150 includes an annular end 151, an annular recess 152, and the connector 53.

The annular end 151 is formed to contact the flange 14 of the first stator 10 on one end side in the axis line S direction.

The annular recess 152 is formed so that the annular seal member $Sr_{21}$ is arranged on the other end side in the axis line S direction.

The annular seal member $Sr_{21}$ is an O-ring made of a rubber material, is fitted into the annular recess 152, and is interposed between the flange 137 of the bobbin 130 and the flat plate member 70 in the axis line S direction.

According to the second embodiment, since the positioning part 134 (a plurality of ridges 134*a*) is formed over the entire area of the through hole 132 of the bobbin 130 in the axis line S direction and is formed as a common positioning part for positioning the first stator 10 and the second stator 120, the structure of the bobbin 130 can be simplified. Accordingly, the bobbin 130 can be easily molded.

Figure 20:
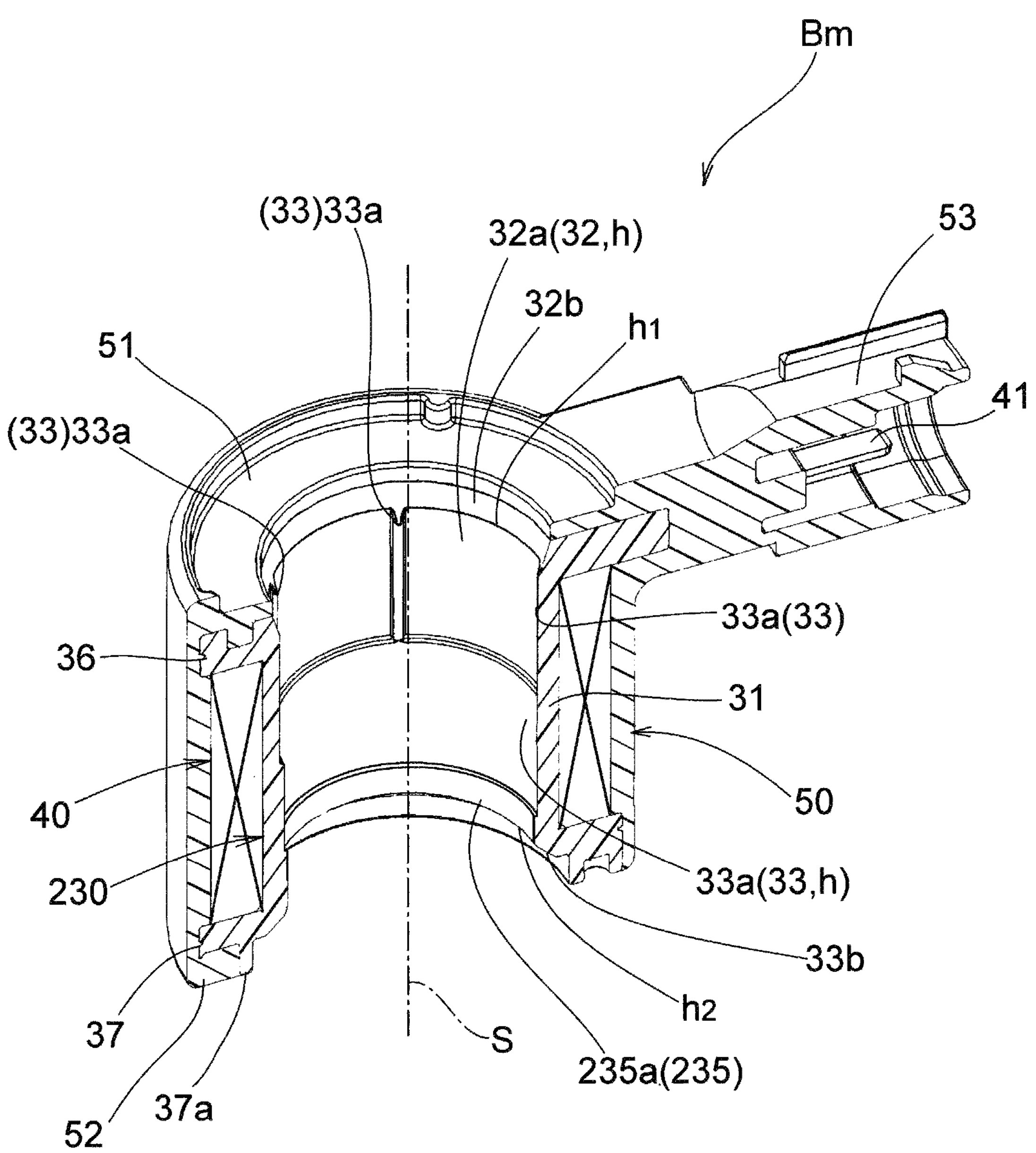
FIG. 20 is a perspective cross-sectional view of a bobbin module included in the electromagnetic actuator according to a third embodiment.

FIG. 20 shows the bobbin module Bm included in an electromagnetic actuator according to a third embodiment of the disclosure, in which the same configurations as in the first embodiment are assigned the same reference numerals and descriptions thereof are omitted.

The bobbin module Bm according to the third embodiment includes a bobbin 230, the coil 40 for excitation, the terminals 41 and 42, and the outer cover member 50 in which the bobbin 230 and the coil 40 are embedded.

The bobbin 230 is made of a resin material. The bobbin 230 includes the cylindrical part 31 centered on the axis line S, the through hole h (first through hole 32 and second through hole 33), the first positioning part 34, a second positioning part 235, the flange 36, and the flange 37.

Near the other end opening $h_2$ of the through hole h in the axis line S direction, the second positioning part 235 is formed as a protruding cylindrical surface 235*a* that protrudes radially inward from the inner wall surface 33*a* and extends over a predetermined length in the axis line S direction.

By inserting the second stator 20 from the other end opening $h_2$ of the through hole h and allowing the outer peripheral fitting part 24 to be fitted thereinto, the second positioning part 235 aligns the center lines of the inner peripheral surface 21*a*, the insertion hole 22, and the guide holes 21*c* and $B_1$ on the axis line S.

According to the third embodiment, since the first positioning part 34 and the second positioning part 235 as the positioning part are formed partially in the through hole h of the bobbin 230, that is, near the one end opening $h_1$ and the other end opening $h_2$ of the through hole h, respectively, similarly to that described above, the first stator 10 and the second stator 20 can be positioned on the axis line S.

In the above embodiments, embodiment are shown in which five ridges 34*a*, 35*a*, and 134*a*, respectively, are provided as the positioning part. However, the disclosure is not limited thereto. In a case where a protruding end of a ridge forms an arcuate surface along an outer peripheral surface of an outer peripheral fitting part of a first stator and a second stator, two ridges that are 180 degrees apart around the axis line S may be adopted as the positioning part.

In the above embodiments, the first stator 10 is shown as the first stator, and the second stators 20 and 120 are shown as the second stator. However, the disclosure is not limited thereto. The first stator and the second stator in other forms may be adopted.

In the above embodiments, the bobbins 30, 130, and 230 are shown as the bobbin. However, a bobbin in other forms may be adopted if it includes a positioning part partially formed in a through hole.

In the first embodiment, a configuration is shown in which the annular seal member $Sr_1$ is interposed between the flange 14 of the first stator 10 and the outer cover member 50. However, the disclosure is not limited thereto. The bobbin may be exposed from the outer cover member and interposed between the first stator and the bobbin in the axis line S direction.

As described above, in the electromagnetic actuator of the disclosure, since the structure can be simplified, the cost can be reduced, the number of parts can be reduced, assembly work can be facilitated, and smooth operation of the mover can be ensured, the electromagnetic actuator of the disclosure is not only applicable for a switching operation of various switching mechanisms related to an engine or a vehicle, but is also useful in a switching mechanism in other fields.

The invention claimed is:

1. An electromagnetic actuator comprising:

a mover, reciprocating along a predetermined axis line;

a first stator and a second stator, accommodating the mover to be capable of reciprocating in a direction of the axis line and arranged spaced apart in the direction of the axis line; and a bobbin, arranged around the first stator and the second stator and around which a coil for excitation is wound, wherein the bobbin comprises: a through hole, through which the first stator and the second stator pass; and a positioning part, partially formed in the through hole, allowing the first stator and the second stator to be fitted thereinto, and positioning the first stator and the second stator on the axis line, wherein the positioning part comprises a first positioning part, formed near one end opening of the through hole in the direction of the axis line and positioning the first stator, and a second positioning part, formed near the other end opening of the through hole in the direction of the axis line and positioning the second stator, the through hole comprises: a first through hole, centered on the axis line; and a second through hole, adjacent to the first through hole in the direction of the axis line and having a smaller diameter than the first through hole, the first positioning part is formed in an area of the first through hole, and the second positioning part is formed in an area of the second through hole.

2. The electromagnetic actuator according to claim 1, wherein the positioning part comprises a plurality of ridges protruding from an inner wall surface of the through hole and extending in the direction of the axis line.

3. The electromagnetic actuator according to claim 1, wherein each of the first positioning part and the second positioning part comprises a plurality of ridges protruding from an inner wall surface of the through hole and extending in the direction of the axis line.

4. The electromagnetic actuator according to claim 1, wherein the first positioning part comprises a plurality of ridges protruding from an inner wall surface of the first through hole and extending in the direction of the axis line; and the second positioning part comprises a plurality of ridges protruding from an inner wall surface of the second through hole and extending in the direction of the axis line.

5. The electromagnetic actuator according to claim 4, wherein the first positioning part is formed so that a protruding end thereof is flush with the inner wall surface of the second through hole.

6. The electromagnetic actuator according to claim 1, wherein the first stator comprises: a cylindrical part, defining an inner peripheral surface that receives the mover; a bottom wall, blocking one end side of the cylindrical part and defining a rest position of the mover; and an outer peripheral fitting part, fitted into the positioning part; and the second stator comprises: an insertion hole, receiving the mover and exposing the mover at a tip thereof; and an outer peripheral fitting part, fitted into the positioning part.

7. The electromagnetic actuator according to claim 6, wherein the mover comprises: a plunger, made of a magnetic material; and a shaft, made of a nonmagnetic material, fixed to the plunger, and exerting a driving force to the outside;

the second stator comprises a guide hole that slidably guides the shaft;

the inner peripheral surface of the first stator receives the plunger in a non-contact manner to be capable of reciprocating; and the insertion hole of the second stator receives the shaft in a non-contact manner to be capable of reciprocating.

8. The electromagnetic actuator according to claim 6, wherein the second stator comprises a stopper that defines an operating position of the mover.

9. The electromagnetic actuator according to claim 1, wherein the bobbin is provided with an outer cover member formed to cover the coil and comprising a connector that surrounds a terminal connected to an end of the coil.

10. The electromagnetic actuator according to claim 9, further comprising:

an annular seal member, interposed between the second stator and the bobbin; and an annular seal member, interposed between the first stator and the outer cover member or the bobbin.

11. The electromagnetic actuator according to claim 1, further comprising:

an outer magnetic path member, connected to the first stator and the second stator and forming a magnetic path.

12. The electromagnetic actuator according to claim 11, wherein the outer magnetic path member comprises: a cylindrical member, connected to the first stator and surrounding the bobbin; and a flat plate member, connected to the second stator and the cylindrical member.

13. The electromagnetic actuator according to claim 12, wherein the flat plate member also serves as a flange member for attachment to an attachment object.

14. The electromagnetic actuator according to claim 1, wherein the mover is provided with a buffer unit that absorbs impact upon the mover contacting the first stator and returning to a rest position.

* * * * *